United States Patent
Nguyen

(10) Patent No.: US 10,605,029 B2
(45) Date of Patent: Mar. 31, 2020

(54) SHOULDER, SHOULDER TOOL, AND METHOD OF SHOULDER INSTALLATION

(71) Applicant: Cameron International Corporation, Houston, TX (US)

(72) Inventor: Dennis P. Nguyen, Pearland, TX (US)

(73) Assignee: Cameron International Corporation, Houston, TX (US)

( * ) Notice: Subject to any disclaimer, the term of this patent is extended or adjusted under 35 U.S.C. 154(b) by 230 days.

(21) Appl. No.: 15/385,706

(22) Filed: Dec. 20, 2016

(65) Prior Publication Data

US 2017/0191332 A1    Jul. 6, 2017

Related U.S. Application Data

(60) Provisional application No. 62/272,974, filed on Dec. 30, 2015.

(51) Int. Cl.
| | |
|---|---|
| *E21B 33/03* | (2006.01) |
| *E21B 23/00* | (2006.01) |
| *E21B 23/01* | (2006.01) |
| *E21B 33/068* | (2006.01) |
| *E21B 33/04* | (2006.01) |

(Continued)

(52) U.S. Cl.
CPC ............ *E21B 33/03* (2013.01); *E21B 23/006* (2013.01); *E21B 23/01* (2013.01); *E21B 23/04* (2013.01); *E21B 33/04* (2013.01); *E21B 33/068* (2013.01); *E21B 43/10* (2013.01); *E21B 2033/105* (2013.01)

(58) Field of Classification Search
CPC .......... E21B 33/03; E21B 33/04; E21B 43/10; E21B 23/01
See application file for complete search history.

(56) References Cited

U.S. PATENT DOCUMENTS

| | | | | |
|---|---|---|---|---|
| 3,661,206 | A | * | 5/1972 | Putch .................... E21B 33/047 166/189 |
| 4,771,828 | A | | 9/1988 | Cassity |

(Continued)

FOREIGN PATENT DOCUMENTS

EP        2357314 A2      8/2011

OTHER PUBLICATIONS

PCT Invitation to Pay Additional Fees for PCT Application No. PCT/US2016/067880 dated Mar. 3, 2017; 7 Pages.

(Continued)

*Primary Examiner* — Robert E Fuller
*Assistant Examiner* — Lamia Quaim
(74) *Attorney, Agent, or Firm* — Fletcher Yoder, P.C.

(57) ABSTRACT

A shoulder includes a shoulder body having a plurality of J-slots disposed circumferentially about the shoulder body at a first axial end of the shoulder body, a retainer ring disposed about the shoulder body having an exterior threaded surface and an annular lip, a load ring having a threaded interior surface configured to interface with the threaded exterior surface of the retainer ring and a tapered bottom surface, and a lock ring having a tapered bottom surface configured to interface with the tapered bottom surface of the load ring such that when the load ring moves axially toward the lock ring, the lock ring radially expands and when the load ring moves axially away from the lock ring, the lock ring radially contracts.

17 Claims, 18 Drawing Sheets

(51) Int. Cl.
*E21B 43/10* (2006.01)
*E21B 23/04* (2006.01)
*E21B 33/10* (2006.01)

(56) References Cited

U.S. PATENT DOCUMENTS

| | | |
|---|---|---|
| 5,092,401 A | 3/1992 | Heynen |
| 5,333,685 A * | 8/1994 | Gilbert .................... E21B 23/06 166/123 |
| 6,571,877 B1 * | 6/2003 | Van Bilderbeek ...... E21B 33/03 166/339 |
| 2004/0056432 A1 | 3/2004 | Walker et al. |
| 2015/0176744 A1 | 6/2015 | Glassman et al. |

OTHER PUBLICATIONS

PCT International Search Report & Written Opinion for PCT Application No. PCT/US2016/067880 dated Apr. 24, 2017; 22 Pages.

* cited by examiner

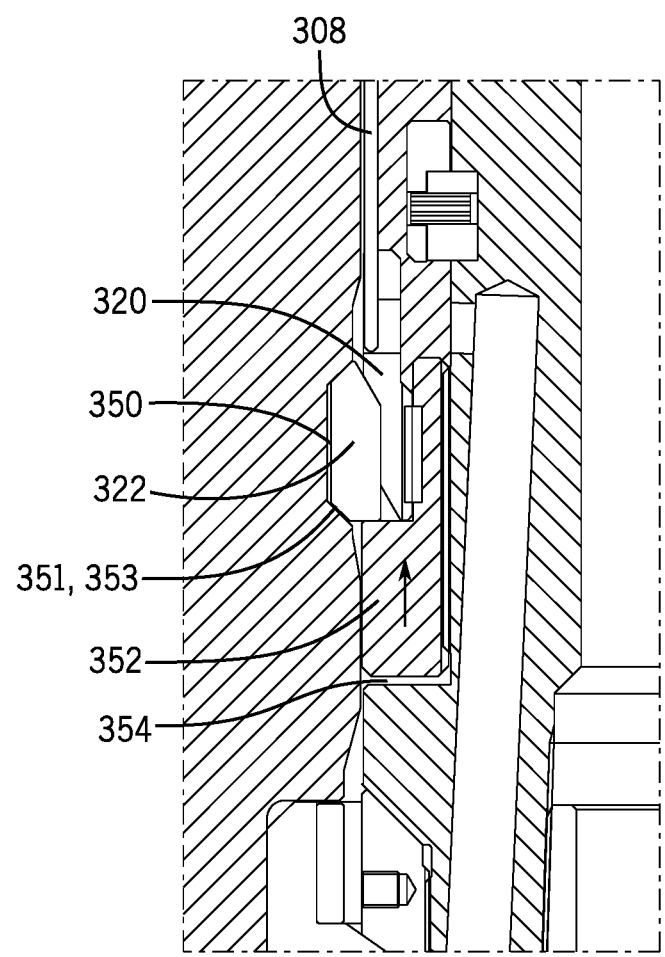
FIG. 11
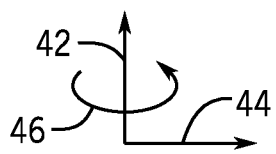
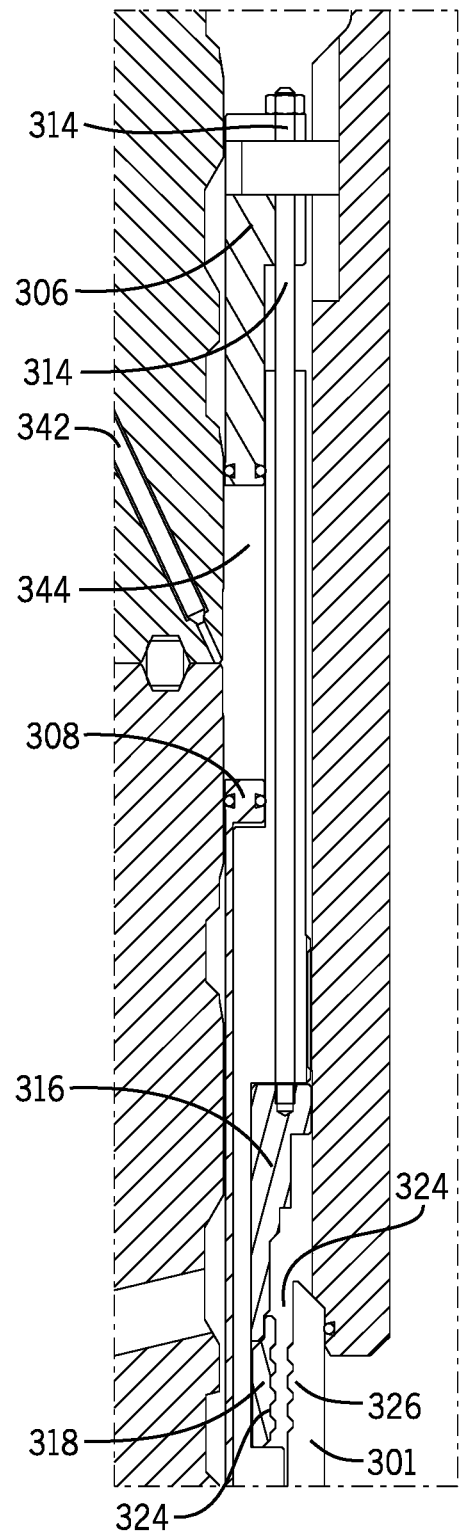
FIG. 12
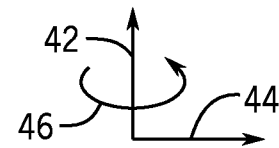

SHOULDER, SHOULDER TOOL, AND METHOD OF SHOULDER INSTALLATION

CROSS REFERENCE TO RELATED APPLICATION

This application claims priority to and benefit of U.S. Provisional Patent Application No. 62/272,974, entitled "WELLHEAD COMPONENTS AND METHODS OF INSTALLATION", filed Dec. 30, 2015, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As will be appreciated, oil and natural gas have a profound effect on modern economies and societies. In order to meet the demand for such natural resources, companies invest time and money in searching for and extracting oil, natural gas, and other subterranean resources from the earth. Particularly, once a desired resource is discovered below the surface of the earth, drilling and production systems are often employed to access and extract the resource. These systems can be located onshore or offshore depending on the location of a desired resource. Further, such systems generally include a wellhead assembly through which the resource is extracted. These wellhead assemblies generally include a wide variety of components and/or conduits, such as various control lines, casings, valves, and the like, that control drilling and/or extraction operations.

In drilling and extraction operations, various components and tools, in addition to and including wellheads, are employed to provide for drilling, completion, and production of a mineral resource. Further, during drilling and extraction operations, one or more seals may be employed to between components to regulate and/or isolate pressures and the like. For instance, a wellhead system often includes one or more hangers (e.g., a tubing hanger or a casing hanger) that is disposed within the wellhead assembly and configured to secure tubing and/or casing suspended in the well bore. The one or more hangers generally provides a path for hydraulic control fluid, chemical injections, or the like to be passed through the wellhead and into the well bore. Additionally, the tubing hanger provides a path for production fluid to be passed through the wellhead and exit the wellhead through a production flow bore to an external production flow line. Additionally, one or more shoulders may be installed in the wellhead assembly to support various components. In certain circumstances, hangers, shoulders, and various other components may be installed in the wellhead using a tool.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 11 is a partial cross sectional side view of an embodiment of the hanger running tool disposed within the wellhead;

FIG. 12 is a partial cross sectional side view of an embodiment of the hanger running tool disposed within the wellhead;

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Embodiments of the present technique include systems and methods for installing various components within a wellhead assembly. As explained in greater detail below, the disclosed embodiments include a spool adapter, a pin hub, an API gasket, a hanger, a hanger running tool, a shoulder, and a shoulder running tool.

A wellhead system often includes a tubing hanger or casing hanger that is disposed within the wellhead assembly and configured to secure tubing and casing suspended in the well bore. In addition, the hanger generally regulates pressures and provides a path for hydraulic control fluid, chemical injections, or the like to be passed through the wellhead and into the well bore. A wellhead system may also include shoulders to support and/or act as stops for various components (e.g., hangers) within the wellhead. The present disclosure includes systems and methods for coupling various wellhead components (e.g., pin hub housing, spool adapter, sections of tubing, sections of casing, etc.) to one another, installing hangers, and installing shoulders.

Figure 1:
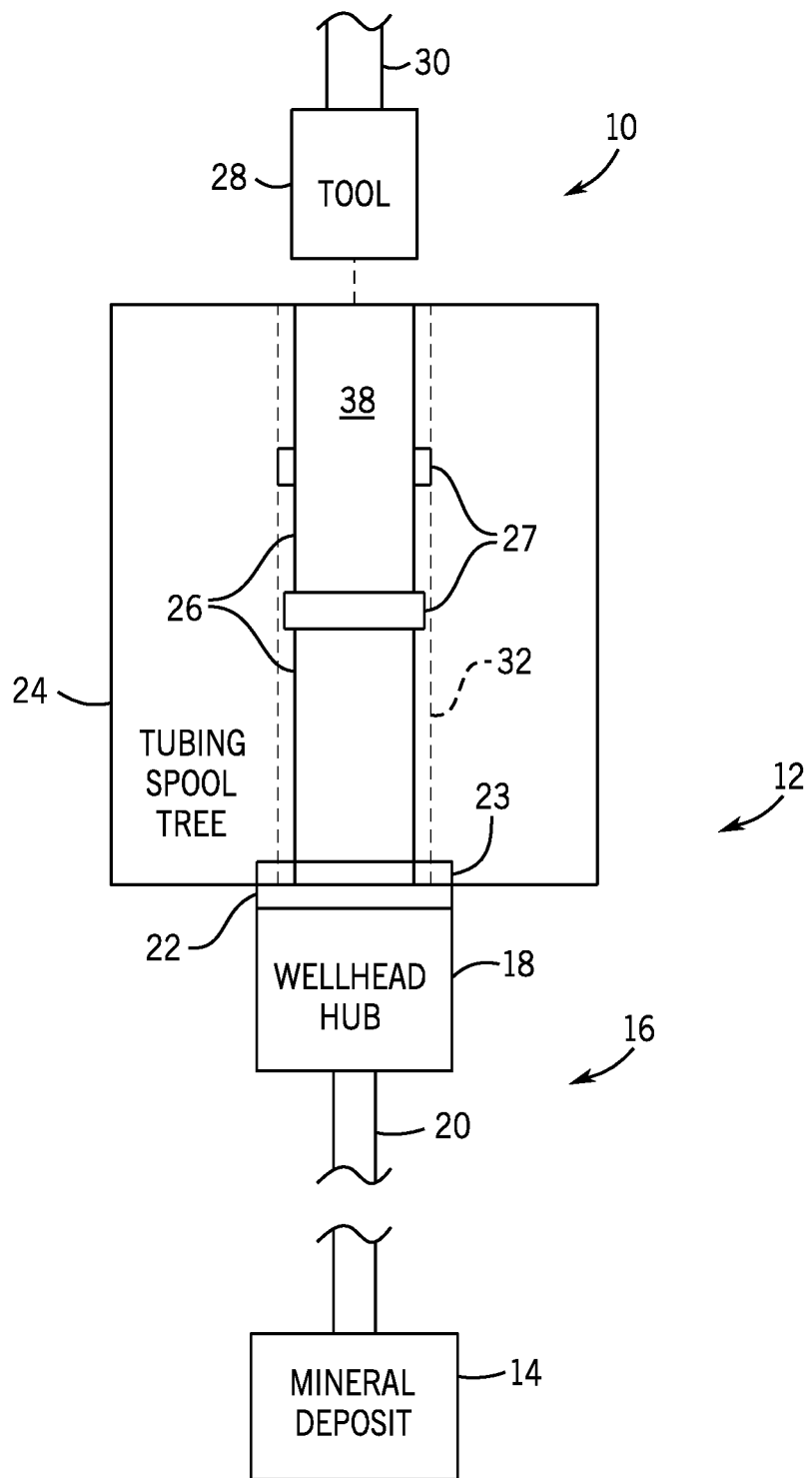
FIG. 1 is a schematic of an embodiment of a mineral extraction system.

FIG. 1 is a schematic of an embodiment of a mineral extraction system 10. The illustrated mineral extraction system 10 can be configured to extract various minerals and natural resources, including hydrocarbons (e.g., oil and/or natural gas), from sub-surface mineral or resource deposits 14, or configured to inject substances into the earth. In some embodiments, the mineral extraction system 10 is land-based (e.g., a surface system) or subsea (e.g., a subsea system). As illustrated, the system 10 includes a wellhead 12 coupled to a mineral deposit 14 via a well 16. For example, the well 16 includes a wellhead hub 18 and a well bore 20.

The wellhead hub 18 may include a large diameter hub that is disposed at the termination of the well bore 20 near the surface. The wellhead hub 18 may provide for the connection of the wellhead 12 to the well 16. The wellhead 12 may be coupled to a connector of the wellhead hub 18. For example, the wellhead 12 may include a connector (e.g., a spool adapter 23) that is configured to interface with, and couple to, a complementary connector (e.g., a pin hub 22) of the wellhead hub 18.

The wellhead 12 generally includes a series of devices and components that control and regulate activities and conditions associated with the well 16. For example, the wellhead 12 may provide for routing the flow of produced minerals from the mineral deposit 14 and the well bore 20, provide for regulating pressure in the well 16, and provide for the injection of chemicals into the well bore 20 (downhole). In the illustrated embodiment, the wellhead 12 includes a tubing spool tree 24 (e.g., a tubing spool or a horizontal tubing spool tree), one or more hangers 26 (e.g., a tubing hanger or a casing hanger), one or more shoulders 27, and the spool adapter 23. The system 10 may also include devices that are coupled to the wellhead 12, and those that are used to assemble and control various components of the wellhead 12. For example, in the illustrated embodiment, the system 10 also includes a tool 28 suspended from a drill string 30. In certain embodiments, the tool 28 may include running tools (e.g., hanger running tools, shoulder running tools, etc.) that are lowered (e.g., run) from an offshore vessel to the well 16, the wellhead 12, and the like.

The tubing spool tree 24 generally includes a variety of flow paths (e.g., bores), valves, fittings, and controls for operating the well 16. For instance, the tubing spool tree 24 may include a frame that is disposed about a body, a flow-loop, actuators, and valves. Further, the tubing spool tree 24 may provide fluid communication with the well 16. For example, the illustrated tubing spool tree 24 includes a spool bore 32. The spool bore 32 may provide for completion and workover procedures, such as the insertion of tools (e.g., the one or more hangers 26, the one or more shoulders 27) into the well 16, the injection of various chemicals into the well 16 (down-hole), and the like. Further, minerals extracted from the well 16 (e.g., oil and natural gas) may be regulated and routed via the tubing spool tree 24. The tubing hanger bore 38 may provide access to the well bore 20 for various completion and worker procedures. For example, components may be run down to the wellhead 12 and disposed in the tubing hanger bore 38 to seal-off the well bore 20, to inject chemicals down-hole, to suspend tools down-hole, to retrieve tools down-hole, and the like.

FIGS. 2-6 are various cross-sectional side views of the interface 78 between the spool adapter 23 and the pin hub 22 shown in FIG. 1, and an API gasket 80 disposed between the spool adapter 23 and the pin hub 22. The pin hub 22 may be part of the wellhead hub 18, disposed at an end of the wellhead hub 18 opposite the well bore 20 in the axial direction 42, where the wellhead hub 18 meets the wellhead 12. The spool adapter 23 may be a part of the wellhead 12, disposed at an end of the wellhead nearest the wellhead hub 18 in the axial direction 42, where the wellhead 12 meets the wellhead hub 18. The spool adapter 23 may be configured to couple to the pin hub 22, enabling a fluid-tight connection at the interface 78 between the wellhead 12 and the wellhead hub 18 such that fluid (e.g., extracted minerals from the mineral deposit 14) may flow (e.g., through tubing or a casing) in the axial direction 42 through the wellhead hub 18 and into the wellhead 12. The disclosed techniques utilize hydraulic pressure to preload the interface 78 between the spool adapter 23 and the pin hub 22 before coupling the spool adapter 23 and the pin hub 22. Using hydraulic pressure to preload the interface 78 reduces or eliminates the need for large and expensive equipment used to mechanically preload the interface 78 (e.g., applying a downward force on the spool adapter 23).

Figure 2:
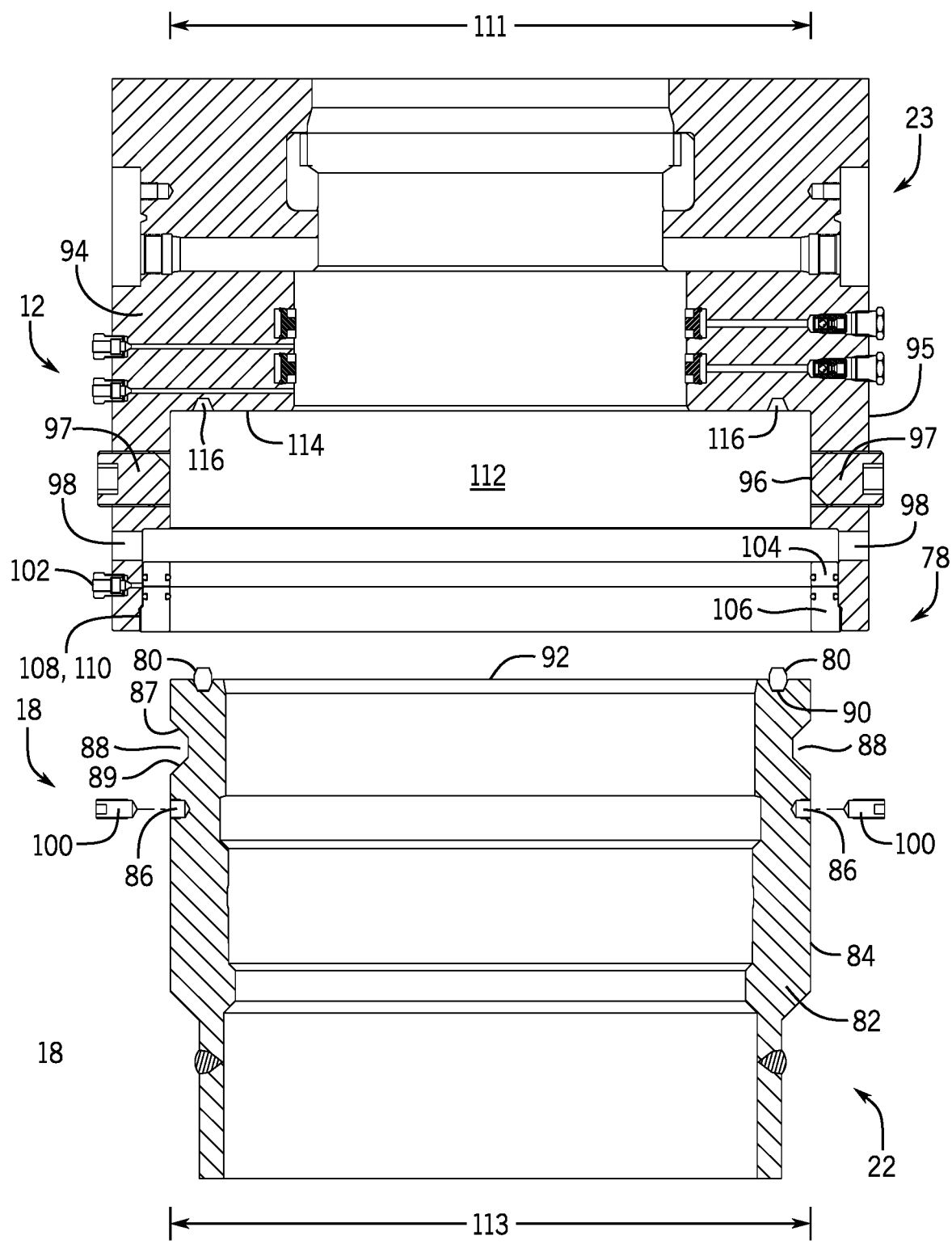
FIG. 2 is a cross-sectional side view of an embodiment of an interface between a spool adapter and a pin hub.

FIG. 2 is a cross-sectional side view of an embodiment of the interface 78 between the spool adapter 23 and a pin hub 22. For clarity, an axial direction 42, a radial direction 44, and a circumferential direction 46 are shown in FIG. 2. These directions may be referenced when describing the proceeding figures and various components shown therein. The pin hub 22 may include a pin hub housing 82 (e.g., a body). The pin hub housing 82 may include a plurality of threaded set screw holes 86 disposed circumferentially 46 about the pin hub housing 82. The threaded set screw holes 86 extend radially 44 inward from an exterior surface 84 of the pin hub housing 82. The pin hub housing 82 may also include an annular lock screw recess 88 extending radially 44 inward from the exterior surface 84 of the pin hub housing 82. The annular lock screw recess 88 may extend circumferentially 46 around the exterior surface 84 of the pin hub housing 82. The annular lock screw recess 88 may have tapered top and bottom surfaces 87, 89. The pin hub housing 82 may also include an annular gasket recess 90 in an axial 42 facing top surface 92 of the pin hub housing 82 for receiving a gasket 80 (e.g., an API gasket).

The spool adapter 23 may have a body 94. The body 94 of the spool adapter 23 has one or more threaded lock screw holes 96 disposed circumferentially 46 about the spool adapter 23, extending radially inward from an exterior surface 95 of the spool adapter 23. The one or more threaded lock screw holes 96 are configured to receive lock screws 97. The body 94 of the spool adapter 23 may also include one or more set screw through holes 98 disposed circumferentially 46 about the body 94. The one or more set screw through holes 98 extend radially 44 inward from the exterior surface 95 of the body 94 through an entire thickness of the body 94. In an installed configuration set screws 100 extend radially 44 through the set screw through holes 98 and into the threaded set screw holes 86 of the pin hub 22. The spool adapter 23 may also include a pressure port 102 disposed on the exterior surface 95 of the spool adapter 23. A piston ring 104 may be disposed within the spool adapter 23, axially 42 above the pressure port 102, and held in place by a retainer ring 106. The piston ring 104 may include one or more annular seals 105 (e.g., an o-ring) disposed between the piston ring 104 and the pin hub housing 82, and between the piston ring 104 and the spool adapter body 94. The retainer ring 106 may be disposed axially 42 below the pressure port 102. The retainer ring 106 may include exterior threads 108, which interface with interior threads 110 of the spool adapter body 94. The retainer ring 106 may include one or more annular seals 107 (e.g., an o-ring) disposed between the retainer ring 106 and the pin hub housing 82, and between the retainer ring 106 and the spool adapter body 94. The body 94 of the spool adapter 23 may have a spool adapter bore 112 extending axially 42 into the body 94. The spool adapter bore 112 has a diameter 111 slightly larger than an outside diameter 113 of the pin hub housing 82 such that the spool adapter bore 112 may receive the pin hub housing 82. The body 94 may have a shoulder 114, at which the spool adapter bore 112 terminates. The shoulder 114 may have an annular gasket recess 116 for receiving the gasket 80 (e.g., the API gasket) of the pin hub 22.

As discussed with regard to FIG. 2, the annular gasket 80 (e.g., API gasket) is disposed at the interface 78 of the spool adapter 23 and the pin hub 22. FIG. 3A is a cross-sectional side view of an embodiment of the API gasket 80. In the embodiment shown in FIG. 3A, a cross section the API gasket 80 (e.g., API BX gasket 140) may be substantially H-shaped with a top recess 142 and a bottom recess 144, such that the API BX gasket 140 includes an annular outside portion 146 and an annular inside portion 148, joined by a stem 150. The inside portion 148 may include one or more top bores 152 and one or more bottom bores 154. The top bores 152 and the bottom bores 154 extend radially 44 outward from an interior volume 156 (e.g., the interior of the wellhead 12 or wellhead hub 18) disposed radially 44 inward of the inside portion 148, to the top recess 142 and bottom recess 144, respectively. The top and bottom holes 152, 154 may fluidly couple the interior volume 156 to the top recess 142 and bottom recess 144, respectively, thereby enabling pressure equalization between the interior volume 156 and the top and bottom recesses 142. When the pressure between the interior volume 156 and the top and bottom recesses 142, 144 is equalized, pressure acts on the outside portion 146 of the gasket 140, improving the seal at the interface 78 between the pin hub 22 and the spool adapter 23.

Figure 3B:
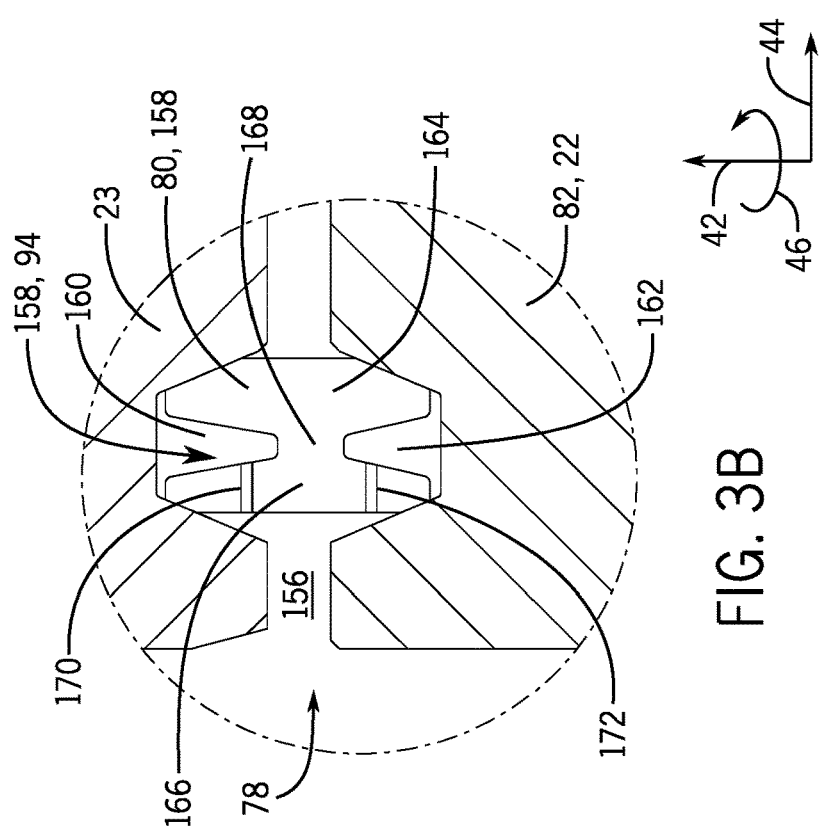
FIG. 3B is a cross-sectional side view of an embodiment of the API gasket.
Figure 3A:
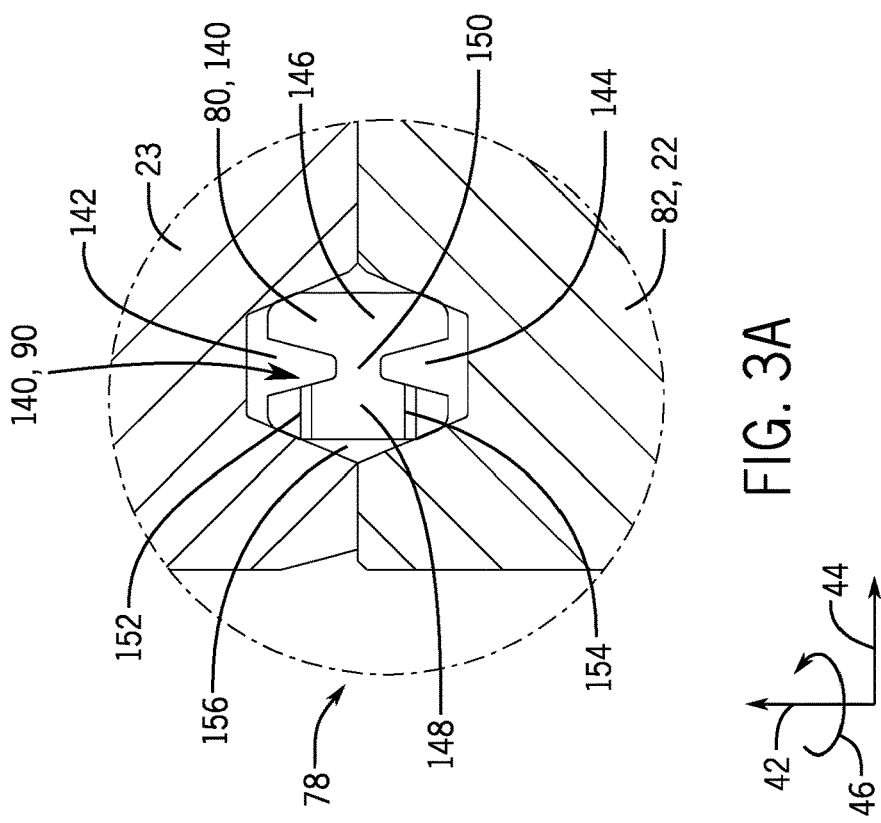
FIG. 3A is a cross-sectional side view of an embodiment of an API gasket.

FIG. 3B is a cross-sectional side view of an embodiment of the API gasket. In the embodiment shown in FIG. 3B, the cross section of the API gasket 80 (e.g., API R/RX gasket 158), the cross section of the gasket 158 may be substantially H-shaped. The gasket 158 includes a top recess 160 and a bottom recess 162. Accordingly, the API R/RX gasket 158 includes an annular outside portion 164 and an annular inside portion 166, joined by a stem 168. Whereas the top recess 142 and bottom recess 144 of the API BX gasket 140 shown in FIG. 3A are of substantially the same size and shape, in the API R/RX gasket 158 shown in FIG. 3B, the top recess 160 is larger than the bottom recess 162. Similarly, the outside portion 164 of the API R/RX gasket 158 is thicker in the radial direction 44 than the inside portion 166. As with the API BX gasket 140, the inside portion 166 of the API R/RX gasket 158 may include at least one top bore 170 and at least one bottom bore 172, which extend radially 44 from the interior volume 156 (e.g., the interior of the wellhead 12 or wellhead hub 18) to the top recess 160 and bottom recess 162, respectively. The top and bottom bores 170, 172 may fluidly couple the interior volume 156 to the top recess 160 and the bottom recess 162, respectively, thereby enabling pressure equalization between the interior volume 156 and the top and bottom recesses 160, 162, such that the pressure in the interior volume 156 acts on the outside portion 164 of the gasket 158. When the pressure between the interior volume 156 and the top and bottom recesses 162, 164 is equalized, pressure acts on the outside portion 164 of the gasket 158, improving the seal at the interface 78 between the pin hub 22 and the spool adapter 23.

Though FIG. 2 depicts the gasket 80 between the spool adapter 23 and the pin hub housing 82, it should be understood that gaskets 80, 140, 158 may be used to form seals elsewhere in the mineral extraction system 10. Furthermore, though API gaskets 80 are typically made of steel, gaskets 80, 140, 158 made of other materials, such as other metals, polymers, elastomers, and the like may be possible.

Figure 4:
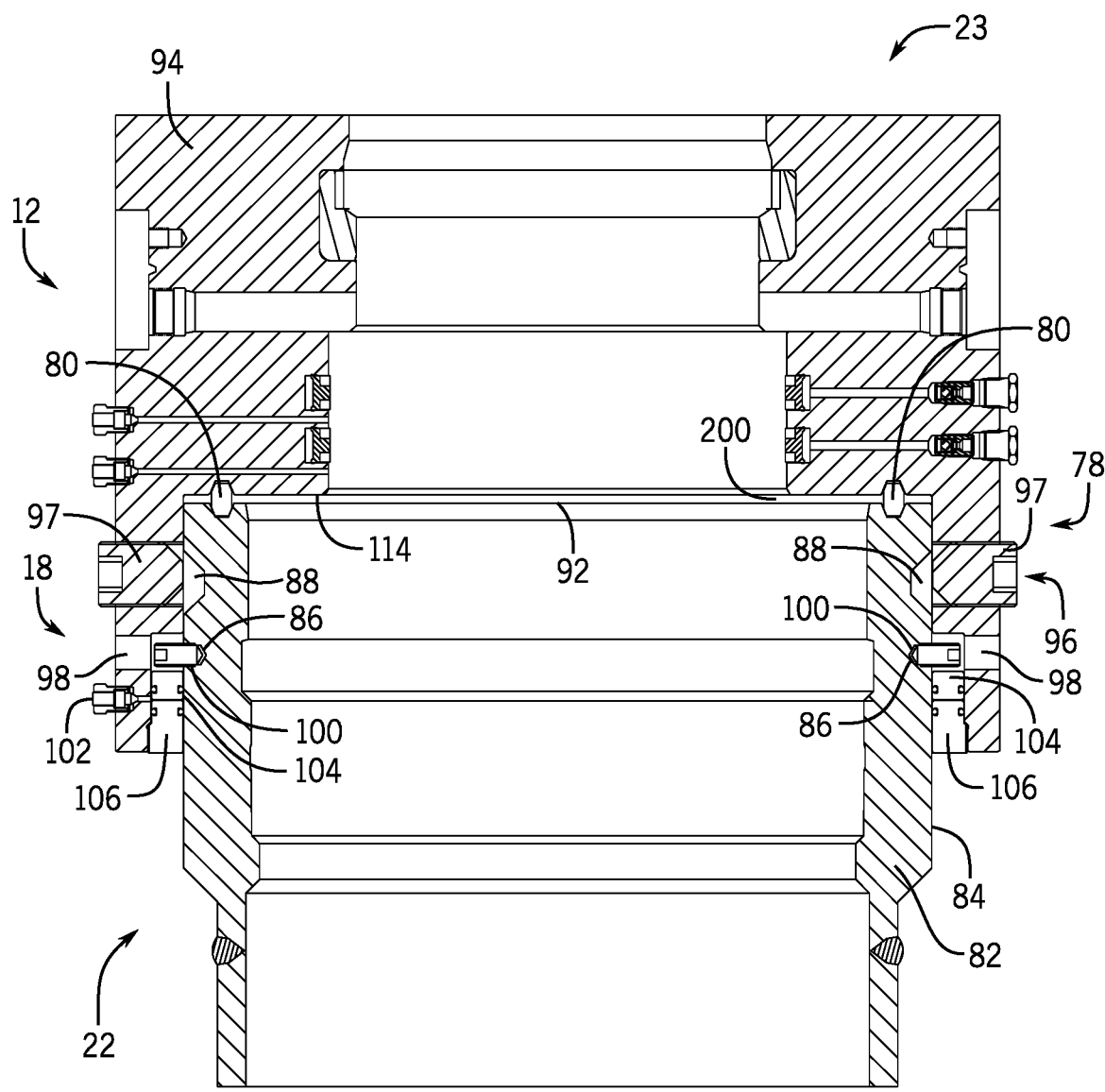
FIG. 4 is a cross sectional side view of an embodiment of the interface between the spool adapter and the pin hub, illustrating a preset position.
Figure 4:
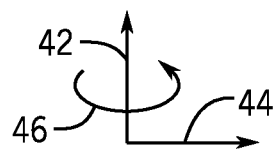

FIG. 4 is a cross sectional side view of an embodiment of the interface 78 between the spool adapter 23 and the pin hub 22, in a preset position. As shown in FIG. 4, the spool adapter 23 has been lowered axially 42 toward the pin hub 22 (e.g., via the tool 28) until the gasket 80 (disposed in the gasket recess 90 of the pin hub housing 82) contacts the gasket recess 116 of the spool adapter 23. This configuration may be referred to as the "running position." In the running position, the set screws 100 inserted radially 44 through the set screw through holes 98 in the spool adapter 23 align with the threaded set screw holes 86 in the pin hub housing 82. The set screws 100 may be inserted through the set screw through holes 86 in the spool adapter 23 and into the threaded set screw holes 86 in the pin hub housing 82. The threads of the set screws 100 engage with threads of the threaded set screw holes 86, as shown in FIG. 4. This configuration may be referred to as the "preset position." In the preset position, there is a gap 200 between the shoulder 114 of the spool adapter 23 and the top surface 92 of the pin hub housing 82. Additionally, in the preset position, the lock screw recess 88 in the pin hub housing 82 does not radially 44 align with the threaded lock screw holes 96 in the spool adapter 23. The lock screw recess 88 and the threaded lock screw holes 96 may be brought into alignment by hydraulically preloading the API gasket 80.

Figure 5:
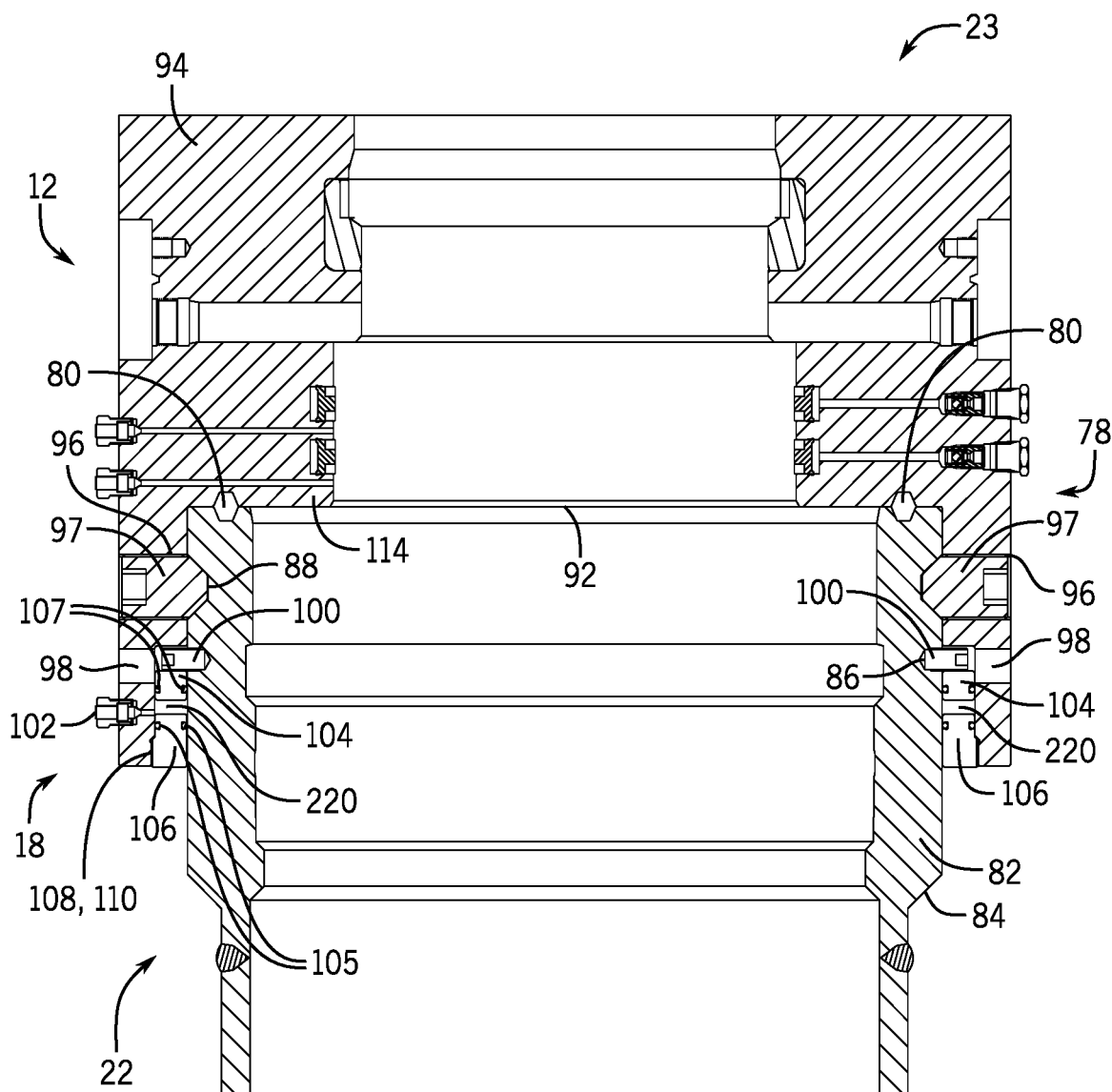
FIG. 5 is a cross sectional side view of an embodiment of the interface between the spool adapter and the pin hub, illustrating in a set position.
Figure 5:
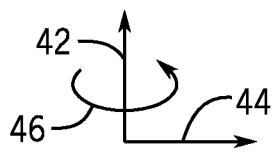

FIG. 5 is a cross sectional side view of an embodiment of the interface 78 between the spool adapter 23 and the pin hub 22, in a set position. To progress from the preset position shown in FIG. 4 to the set position shown in FIG. 5, hydraulic pressure is applied via the pressure port 102. The hydraulic pressure may be provided via a conduit (e.g., hydraulic line, hose, manifold etc.), which may be fluidly coupled to a source of hydraulic pressure (e.g., a hydraulic pump, a reservoir of hydraulic fluid, etc.). The applied pressure causes the piston ring 104 and the retainer ring 106 to separate from one another in the axial direction 42, forming a gap 220. The piston ring 104 pushes against the set screws 100. Because the retainer ring 106 is attached to the spool adapter 23 via the threads 108, 110, the retainer ring 106 pulls the spool adapter 23 toward the pin hub 22, closing the gap 200 (shown in FIG. 4). When the gap 200 is closed, the spool adapter 23 and the pin hub 22 are in the set position. In the set position, the threaded lock screw holes 96 of the spool adapter 23 radially align with the lock screw recess 88 of the pin hub housing 82. The lock screws 97 are tightened, locking the spool adapter 23 and the pin hub 22 in place.

Figure 6:
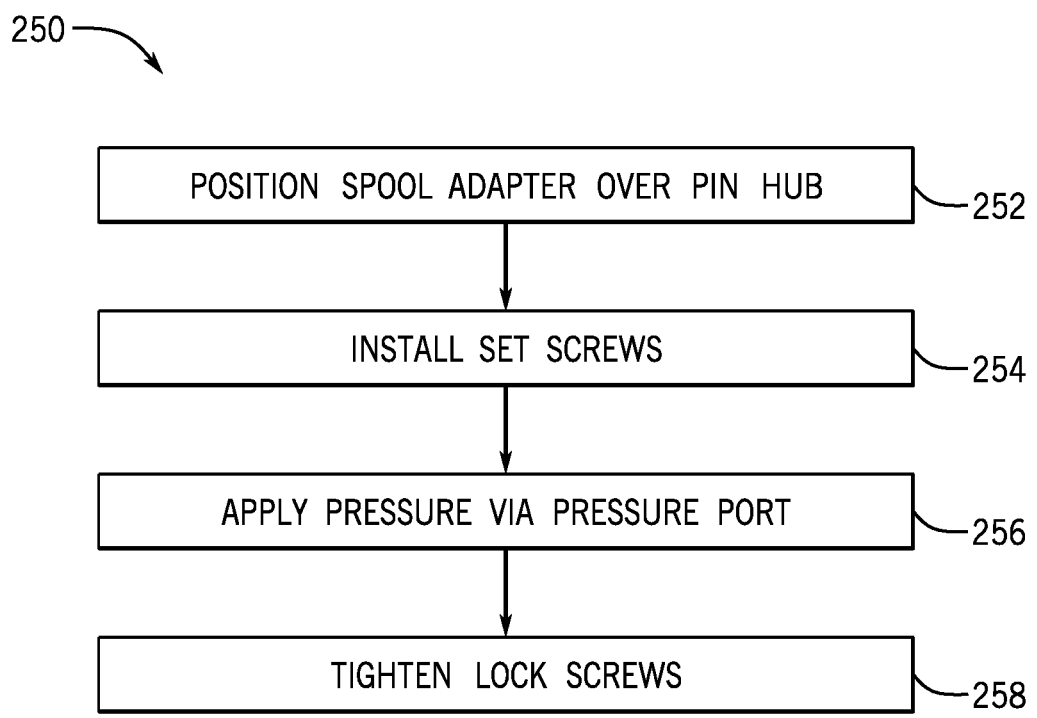
FIG. 6 is a flow chart illustrating one embodiment of a process for attaching the spool adapter to the pin hub.

FIG. 6 is a flow chart 250 illustrating an embodiment of a process for attaching the spool adapter 23 to the pin hub 22, as shown and described with regard to FIGS. 2-5. In block 252, the spool adapter 23 is positioned over the pin hub 22. This may be done by lowering the spool adapter 23 in the axial direction 42 onto the pin hub 22 (e.g., via the tool 28). The spool adapter 23 may be lowered axially toward the pin hub 22 until the API gasket 80 is in contact with both the gasket recess 90 of the pin hub 22 and the gasket recess 116 of the spool adapter 23. In this position, referred to as the running position, there is a gap 200 between the top surface 92 of the pin hub housing 82 and the shoulder 114 of the spool adapter. At this point, the threaded set screw holes 86 in the pin hub housing 82 may substantially radially align with the set screw through holes 98 in the spool adapter 23.

In block 254, the set screws 100 are installed. The set screws 100 may be inserted radially 44 into the set screw through holes 98 in the spool adapter 23. The threads of the set screws 100 may then engage with the threads in the threaded set screw holes 86 in the pin hub housing 82. When tightened, the set screw 100 may protrude radially outward of the threaded set screw holes 86. The set screws 100 may act as a stop such that the piston ring 104 may push against the set screws 100. This position is referred to as the preset position.

In block 256, pressure is applied via the pressure port 102. The applied pressure between the piston ring 104 and the retainer ring 106 (each having annular seals 105, 107), causes the piston ring 104 and the retainer ring 106 to separate from one another. The set screws 100 protruding out of the pin hub housing 82 act as a stop for the piston ring 104. The pressure causes the piston ring 104 to pushes against the set screws 100 as the retainer ring 106 moves downward, away from the piston ring 104. Because the retainer ring 106 is attached to the spool adapter 23 by threads 108, 110, the retainer ring 106 pulls the spool adapter 23 with it as the retainer ring moves axially 42 downward. As the spool adapter 23 moves axially 42 downward, the gap 200 closes and the API gasket 80 is loaded. As the spool adapter 23 moves axially 42 downward toward the pin hub housing 82, the lock screw recess 88 in the pin hub housing 82 aligns with the threaded lock screw holes 96 in the spool adapter 23.

In block 258, the lock screws 97 are tightened. The threads on the exterior of the lock screw 97 engage with the threads on the interior of the threaded lock screw holes 96. As the lock screws 97 are tightened, the tips of the lock screws 97 engage with the lock screw recess 88 in the pin hub housing 82, holding the pin hub housing 82 and the spool adapter 23 in place relative to one another. This position may be referred to as the set position. In the set position, pressure may be released from the pressure port 102, and/or the set screws 100 may be removed.

Figure 7:
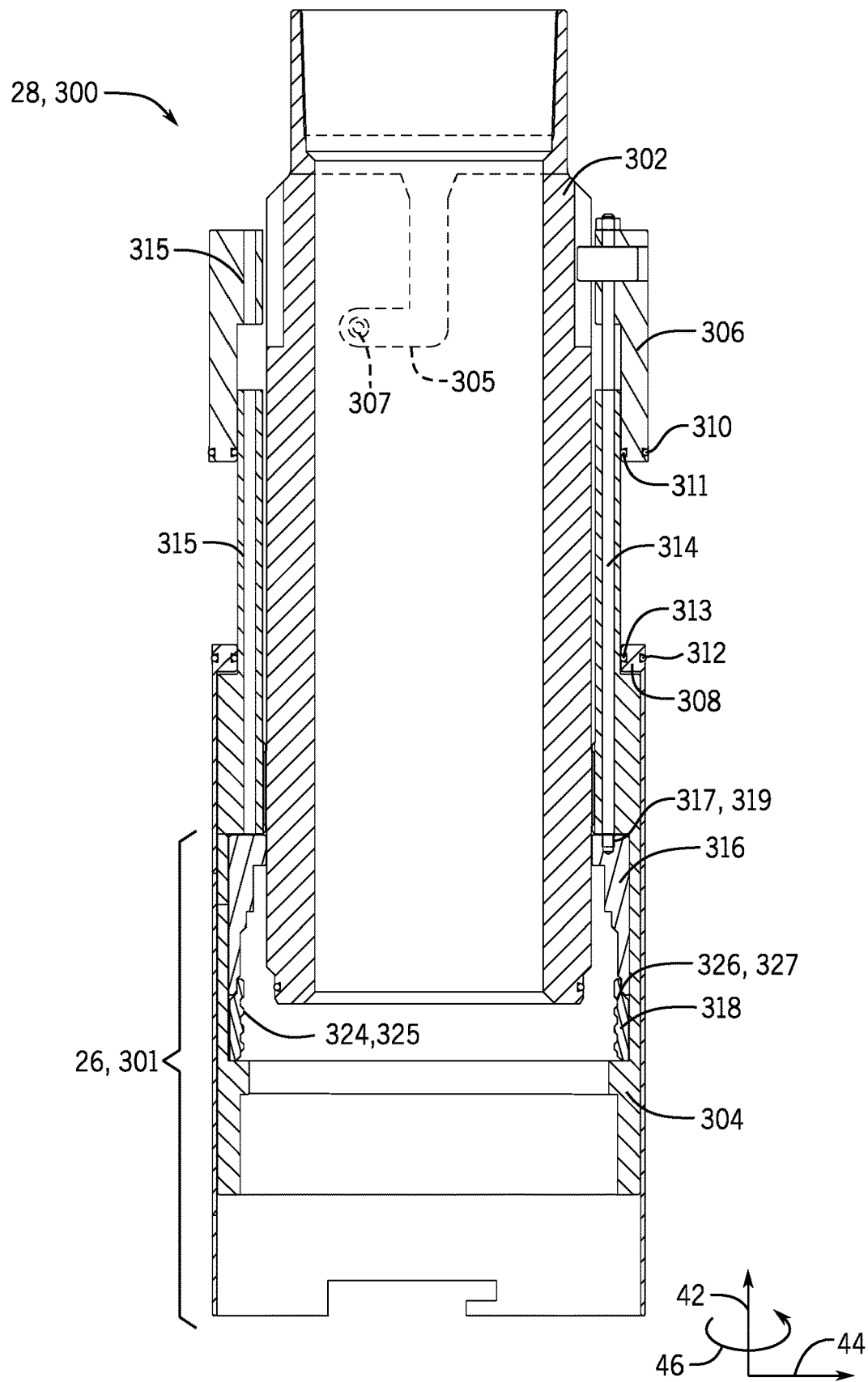
FIG. 7 is a cross sectional side view of an embodiment of a hanger running tool and the hanger.

FIGS. 7-15 illustrate embodiments of a system and method for installing a hanger in the spool adapter 23, or elsewhere in the tubing spool tree 24 or the wellhead 12. FIG. 7 illustrates an embodiment of a hanger running tool 300 with a hanger 301 coupled to the hanger running tool 300. The hanger running tool 300 may be the tool 28 depicted in FIG. 1. Similarly, the hanger 301 may be the same as the hanger 26 shown in FIG. 1.

The hanger running tool 300 has an upper body 302 and a lower body 304. An upper piston 306 is disposed about the upper body 302. A lower piston 308 is disposed about the upper body 302 and the lower body 304. The upper piston 306 and the lower piston 308 each have respective interior seal rings 311, 313 configured to form a seal with the lower body 304, and respective exterior seal rings 310, 312 configured to form a seal with a surrounding casing. One or more bolts 314 may be disposed about and exterior to the hanger running tool 300. The bolts 314 may extend axially 42 through bolt holes 315 in the upper piston 306 and the lower body 304 of the hanger running tool 300. The bolts 314 may be mechanically coupled to a first push ring 316. In the embodiment shown in FIG. 7, threads 319 on the bolts 314 interface with one or more threaded holes 317 of the first push ring 316. The hanger running tool 300 may also include a first lock ring 318. The first lock ring 318 couples the hanger 301 to the hanger running tool 300 as the hanger running tool 300 is run axially 42 down to, and into, the wellhead 12. Specifically, the first lock ring 318 has teeth 324 on an interior surface 325 of the lock ring 318 that interface with corresponding teeth 326 on an exterior surface 327 of the hanger 301 in order to couple the hanger 301 to the hanger running tool 300. The first lock ring 318 interfaces with the first push ring 316 such that when the first push ring 316 moves axially 42 downward, the first push ring 316 pushes the first lock ring 318 radially 44 inward. As the first lock ring 318 moves radially 44 inward, the teeth 324 of the first lock ring 318 engage with the teeth 326 of the hanger 301, retaining the hanger 301. Correspondingly, when the first push ring 316 moves axially 42 upward, the first push ring 316 releases the first lock ring 318, allowing the first lock ring 318 to expand radially 44 outward. As the first lock ring 318 expands radially 44 outward, the teeth 324 of the first lock ring 318 disengage from the teeth 326 of the hanger 301, freeing the hanger 301 from the hanger running tool 300. The hanger running tool 300 may also include one or more J-slots 305 that interface with the hanger 301 via a shear pin 307. Shearing the shear pin 307 may decouple, or partially decouple, the hanger running tool 300 and the hanger 300, enabling relative rotation (e.g. circumferential 46 movement).

Figure 8:
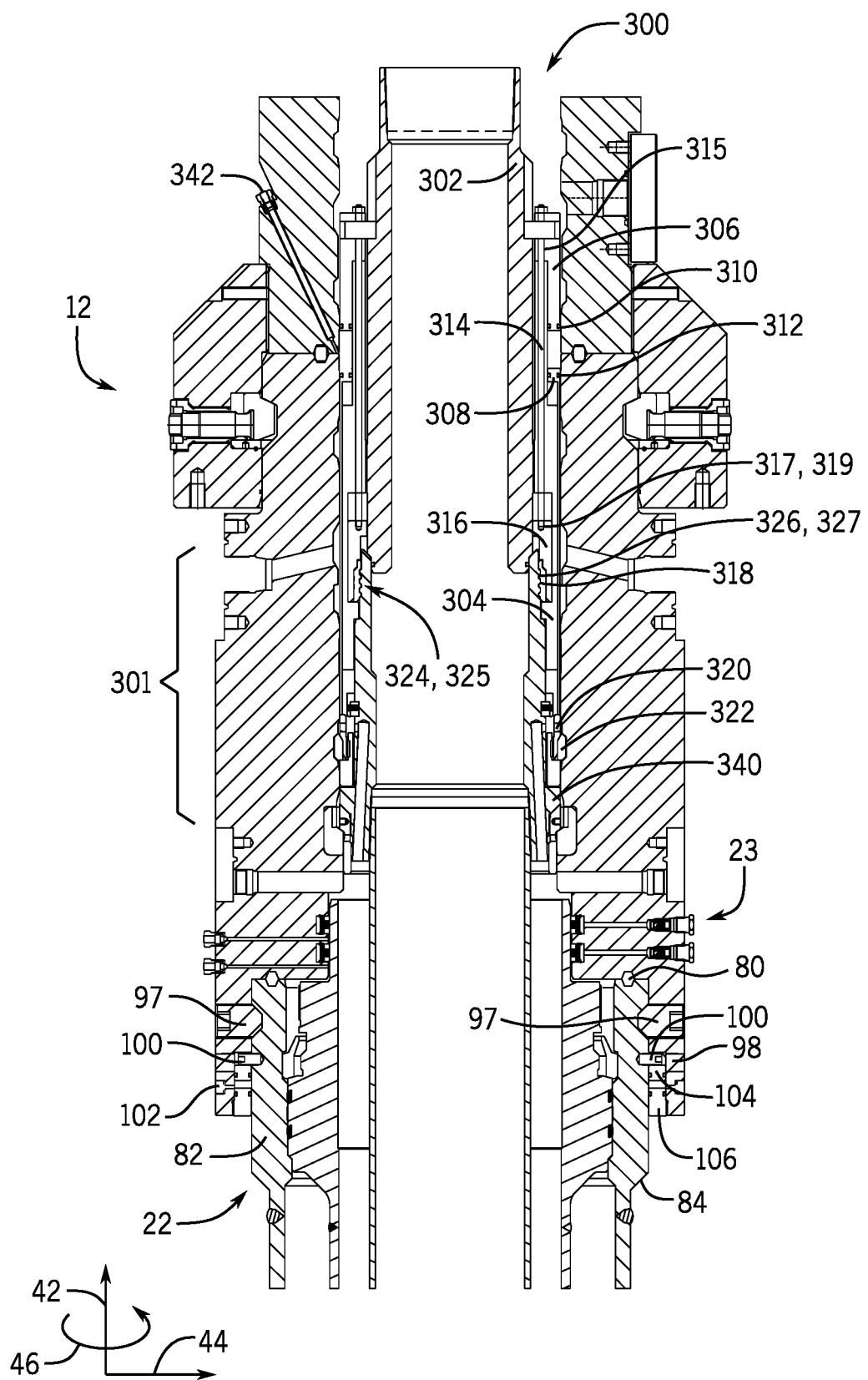
FIG. 8 is a cross sectional side view of an embodiment of the hanger running tool and hanger disposed within a wellhead.

FIG. 8 is a cross sectional side view of an embodiment of the hanger running tool 300 disposed within the wellhead 12. The hanger running tool 300 is inserted (e.g., run) into the spool adapter 23, or other wellhead 12 component, until the hanger 301 lands on a tapered shoulder 340. The tapered shoulder 340 may have been previously installed in the wellhead (e.g., via a shoulder running tool as shown and described with regard to FIGS. 16-20). In some embodiments, the tapered shoulder 340 may be part of a component previously installed in the wellhead 12. For example, in the present embodiment, the tapered shoulder 340 is part of the spool adapter 23. This arrangement, with the hanger running tool 300 disposed within the wellhead 12, and the hanger running tool 300 or the hanger 301 lands on a tapered shoulder 340, is referred to as the "running position." From the running position, pressure is applied via a test port 342. The test port 342 may be a pre-existing component in the wellhead 12 enabling a user to test the pressure in the wellhead 12. The pressure applied via the test port 342 may be pneumatic or hydraulic pressure provided via a conduit (e.g., hose, manifold, hydraulic line, etc.), which may be fluidly coupled to a source of pressure (e.g., a pump, a reservoir of hydraulic fluid, a cylinder, etc.).

Figure 9:
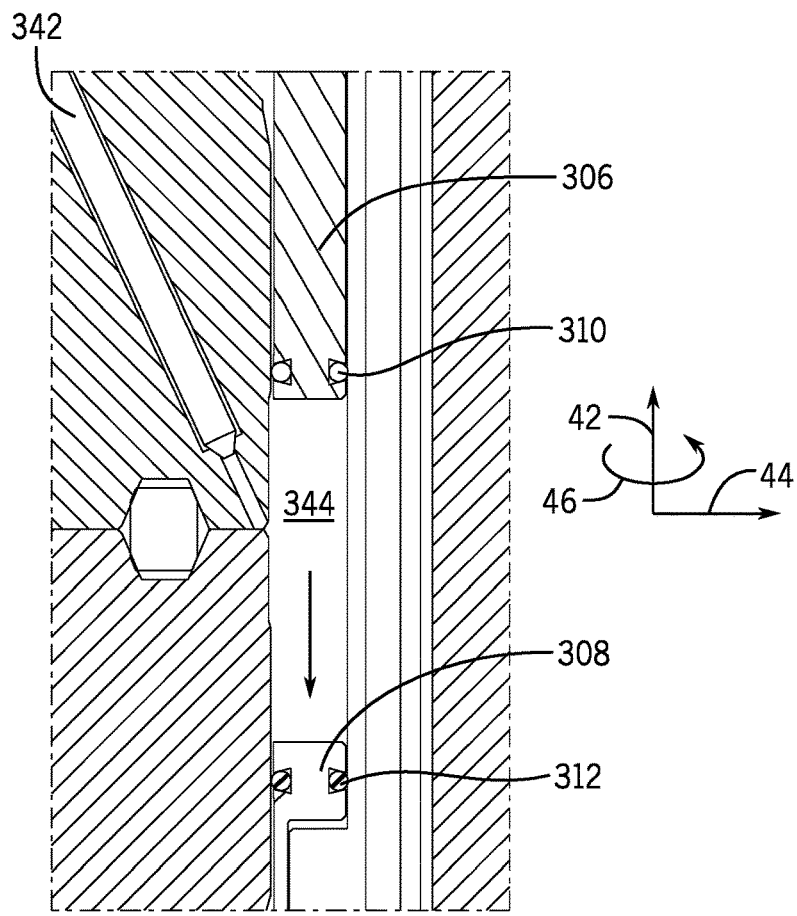
FIG. 9 is a partial cross sectional side view of an embodiment of the hanger running tool disposed within the wellhead.

FIG. 9 is a partial cross sectional side view of an embodiment of the hanger running tool 300 disposed within the wellhead 12. As pressure is applied via the test port 342, the pressure in a volume 344 between the upper piston 306 and the lower piston 308 increases. The respective seals 310, 312 in the upper piston 306 and lower piston 308 keep the volume 344 sealed to contain the pressure. The upper piston 306 stays stationary because it is rigidly coupled to the upper body 302. Accordingly, the pressure in the volume 344 acts to push the lower piston 308 axially 42 downward.

Figure 10:
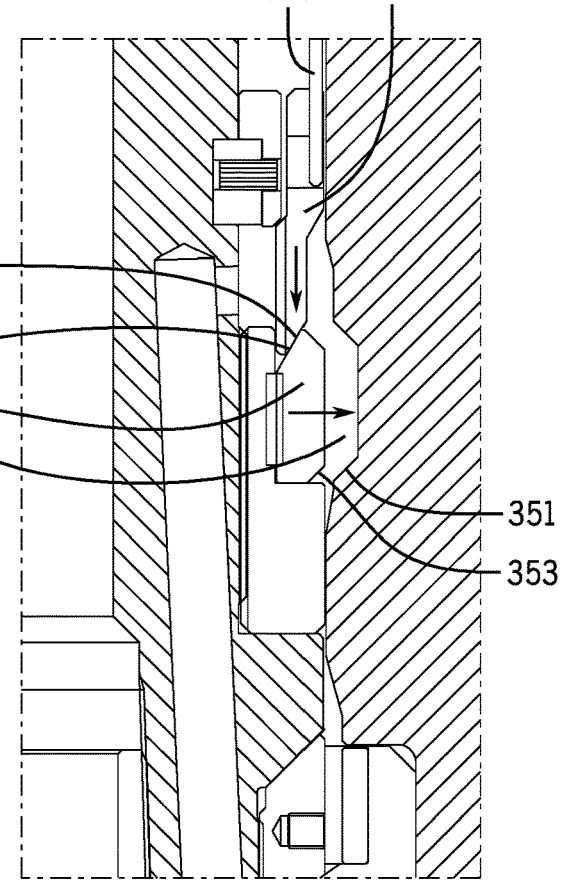
FIG. 10 is a partial cross sectional side view of an embodiment of the hanger running tool disposed within the wellhead.

FIG. 10 is a partial cross sectional side view of an embodiment of the hanger running tool 300 disposed within the wellhead 12. As shown in FIG. 10, the lower piston 308 may interface with a second push ring 320 and a second lock ring 322. When the lower piston 308 moves axially 42 downward, the lower piston 308 pushes the second push ring 320 axially 42 downward, which in turn pushes the second lock ring 322 radially 44 outward. As the lower piston 308 moves axially 42 downward, it pushes the second push ring 320 axially 42 downward. The bottom end of the second push ring 320 includes a tapered exterior surface 346 that interfaces with a tapered interior surface 348 of the second lock ring 322. As the second push ring 320 moves axially 42 downward, the tapered exterior surface 346 interfaces with the tapered interior surface 348 of the second lock ring 322, which pushes the second lock ring 322 radially 44 outward into a groove 350 of the spool adapter 23. The pressure may then be released and the hanger 301 overpulled (e.g., the hanger 301 may be pulled axially 42 upward via the hanger running tool 300 by pulling the hanger running tool axially 42 upward) to ensure the second lock ring 322 is set in position.

FIG. 11 is a partial cross sectional side view of an embodiment of the hanger running tool 300 and hanger 301 disposed within the wellhead 12, illustrating preloading of the second lock ring 322. A quarter-turn of the hanger running tool 300 (e.g., in the circumferential direction 46) shears the shear pin 307 (FIG. 7), which decouples the hanger running tool 300 and the hanger 301. The quarter turn of the hanger running tool 300 (e.g., in the circumferential direction 46) pushes the second lock ring 322 completely into the groove 350, thereby preloading the second lock ring 322. Because the groove 350 has tapered edges 351, the second lock ring 322 moves upward axially 42 as the tapered bottom surface 353 of the second lock ring 322 interfaces with the tapered surface 351 of the groove 350. As the second lock ring 322 moves up and expands radially 44 into the groove 350, a retainer ring 352 also moves axially 42 upward. As the retainer ring 352 moves upward, a gap 354 is opened. At this point, cementing operations may be performed.

FIG. 12 is a partial cross sectional side view of an embodiment of the hanger running tool 300 and the hanger 301 disposed within the wellhead, illustrating a second pressure. The second pressure is applied via the test port 342. The pressure applied via the test port 342 may be pneumatic or hydraulic pressure provided via a conduit (e.g., hose, manifold, hydraulic line, etc.), which may be fluidly coupled to a source of pressure (e.g., a pump, a reservoir of hydraulic fluid, a cylinder, etc.). As the second pressure is applied via the test port 342, the pressure in volume 344 increases. The increased pressure in volume 344 pushes the upper piston 306 axially 42 upward. Because the first push ring 316 is coupled to the upper piston 306 via bolts 314, the push ring 316 lifts axially 42 upward as the upper piston 306 is pushed axially 42 upward. As the push ring 316 lifts axially 42 upward, the first lock ring 318 is released, enabling the first lock ring 318 to expand radially 44 outward. As the first lock ring 318 expands radially 44 outward, the teeth 324 of the first lock ring 318 disengage from the teeth 326 of the hanger 301. Because the shear pin 307 has been sheared and the teeth 324 of the first lock ring 318 are disengaged from the teeth 326 of the hanger 301, the hanger running tool 300 and the hanger 301 are decoupled from one another. Pressure may then be released via the test port 342.

Figure 13:
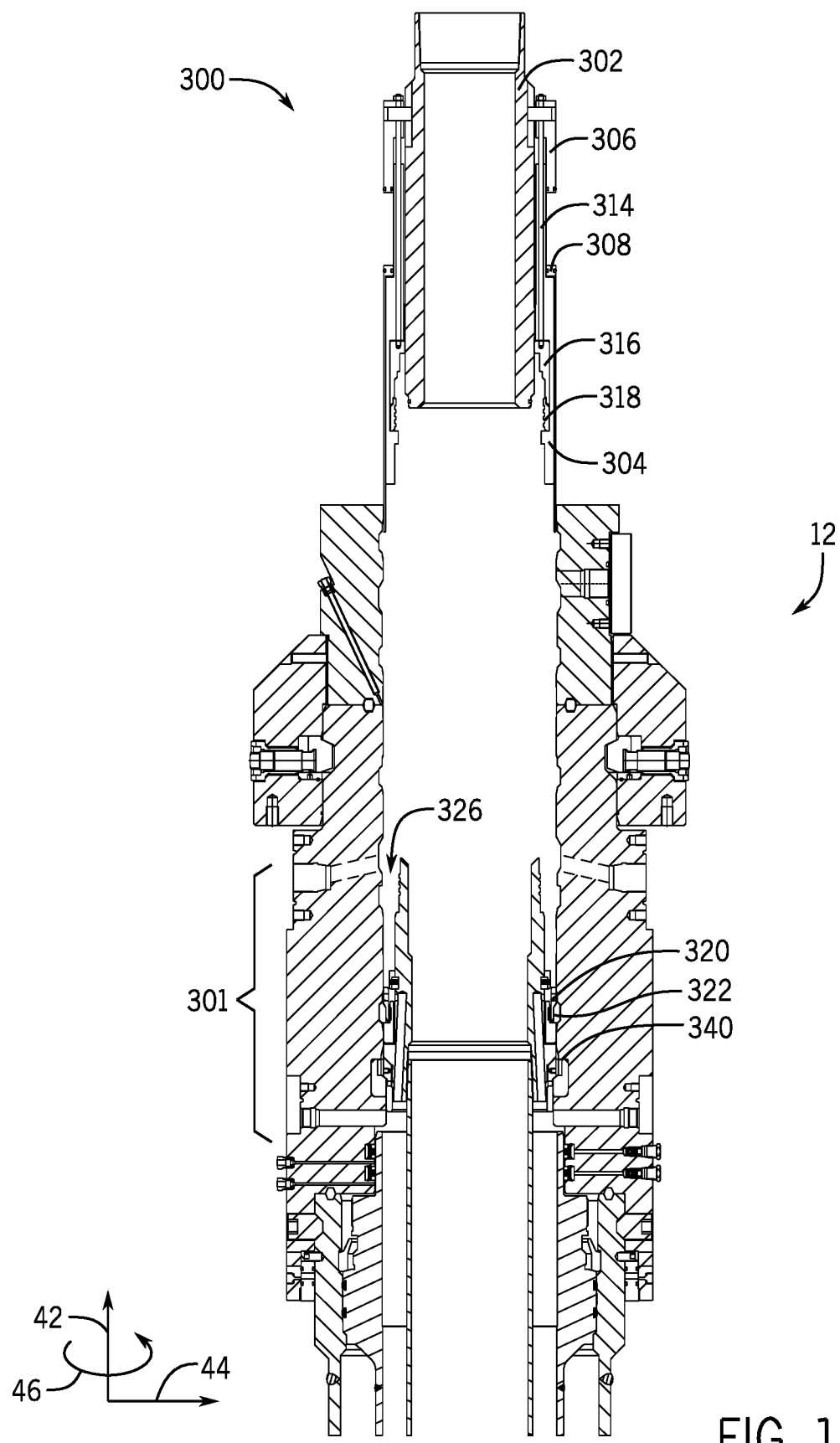
FIG. 13 is a cross sectional side view of an embodiment of the hanger running tool being removed from the wellhead, in accordance with an embodiment of the present disclosure.

FIG. 13 is a cross sectional side view of an embodiment of the hanger running tool 300 being removed from the wellhead 12. Because the hanger running tool 300 and the hanger 301 are decoupled from one another, the hanger running tool 300 may be removed by pulling the tool straight up axially 42 through the wellhead 12.

Figure 14:
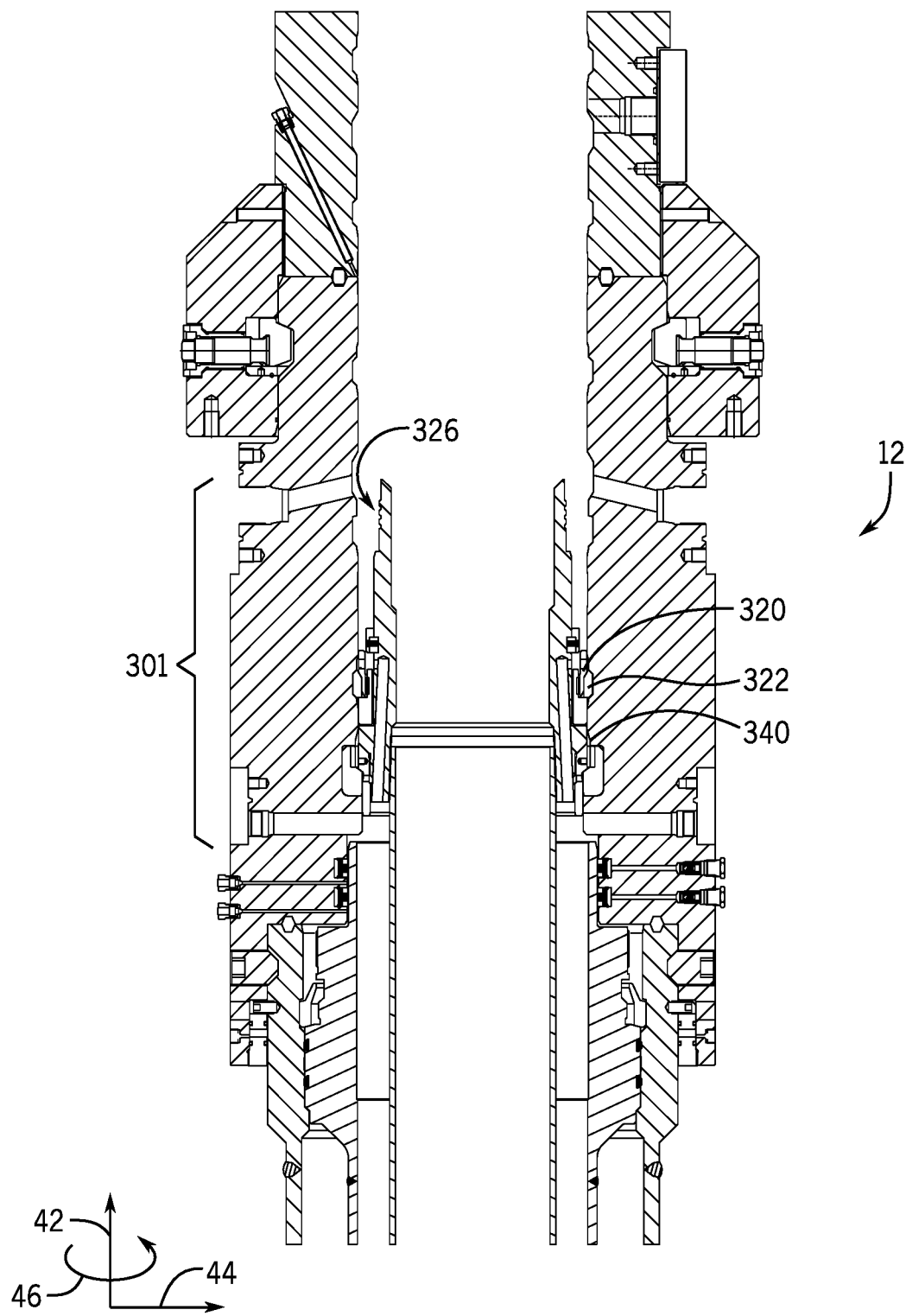
FIG. 14 is a cross sectional side view of the wellhead with the hanger running tool fully removed, in accordance with an embodiment of the present disclosure.

FIG. 14 is a cross sectional side view of the wellhead with the hanger running tool fully removed and the hanger 301 installed. At this point, casing, tubing, additional components, shoulders 27, or hangers 26 may be installed.

Figure 15:
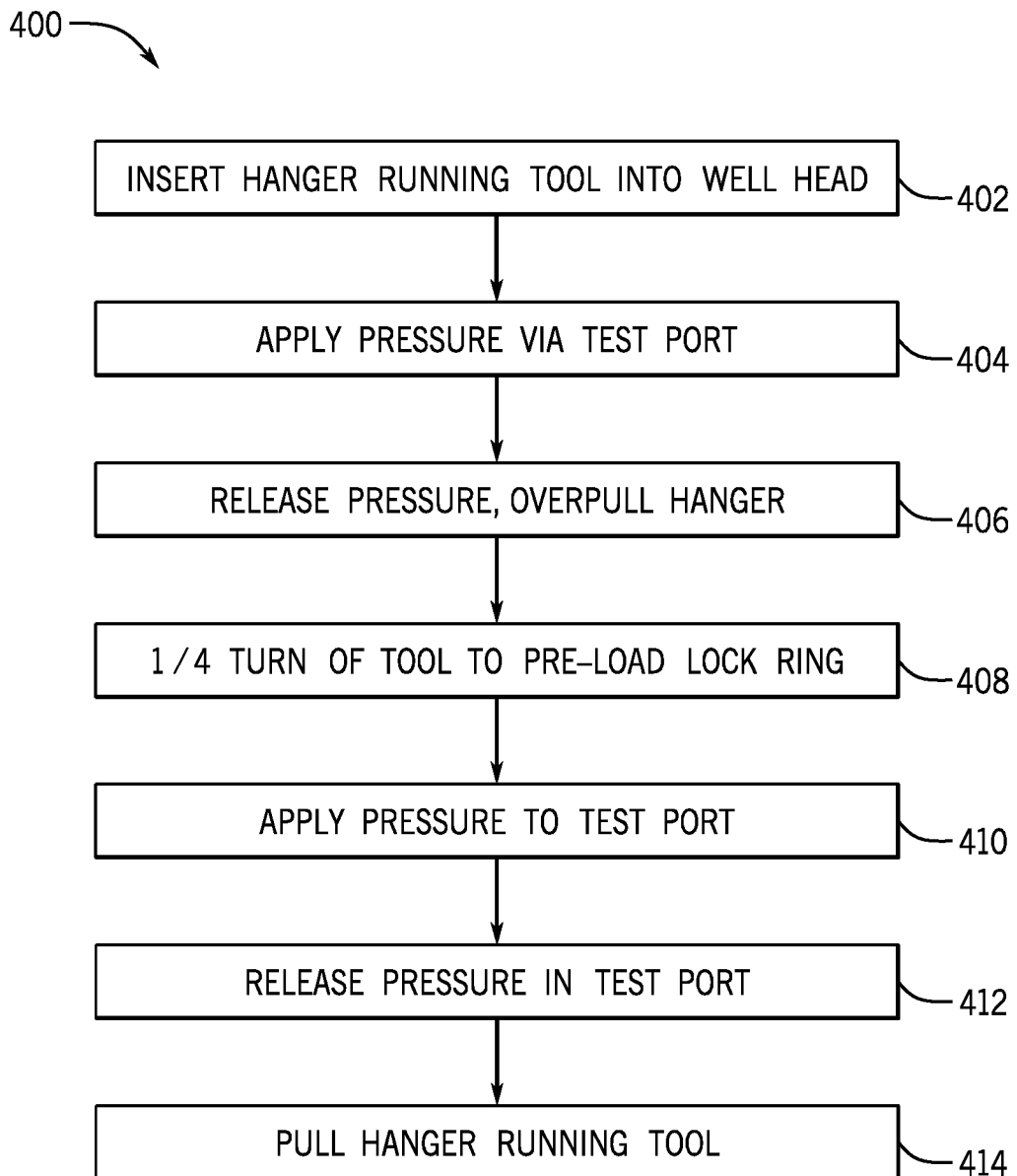
FIG. 15 is a flow chart illustrating one embodiment of a process for installing a hanger in a wellhead using the hanger running tool.

FIG. 15 is a flow chart of a process 400 for installing the hanger 301. In block 402, the hanger running tool 300 is inserted into the wellhead 12. The hanger running tool 300 is lowered into the wellhead 12 until the hanger running tool 300 lands on the tapered shoulder 340. The tapered shoulder 340 may have been previously installed in the wellhead (e.g., via a shoulder running tool as shown and described with regard to FIGS. 16-20). In some embodiments, the tapered shoulder 340 may be part of a component previously installed in the wellhead 12. For example, in the present embodiment, the tapered shoulder 340 is part of the spool adapter 23. This is referred to as the running position.

In block 404, pressure is applied via the test port 342. The test port 342 may be a pre-existing component in the wellhead 12 enabling a user to test the pressure in the wellhead 12. The pressure applied via the test port 342 may be pneumatic or hydraulic pressure provided via a conduit (e.g., hose, manifold, hydraulic line, etc.), which may be fluidly coupled to a source of pressure (e.g., a pump, a reservoir of hydraulic fluid, a cylinder, etc.). As pressure is applied via the test port 342, the pressure in the volume 344 between the upper piston 306 and the lower piston 308 increases, pushing the lower piston 308 axially 42 downward. The lower piston 308 may be coupled to the second push ring 320 and the second lock ring 322. When the lower piston 308 moves axially 42 downward, the lower piston 308 pushes the second push ring 320 axially 42 downward. As the second push ring 320 moves axially 42 downward, the second push ring 320 pushes the second lock ring 322 radially 44 outward into the groove 350 of the spool adapter 23. In block 406, pressure is released via the test port 342 and the hanger overpulled (e.g., the hanger 301 may be pulled axially 42 upward via the hanger running tool 300 by pulling the hanger running tool axially 42 upward) to ensure the second lock ring 322 is set in position.

In block 408, the tool is rotated a quarter turn to preload the second lock ring 322. The quarter-turn of the hanger running tool 300 (e.g., in the circumferential direction 46) shears the shear pin 307 (FIG. 7), which decouples the hanger running tool 300 and the hanger 301. The quarter turn of the hanger running tool 300 (e.g., in the circumferential direction 46) pushes the second lock ring 322 completely into the groove 350, thereby preloading the second lock ring 322. Because the groove 350 has tapered edges 351, the second lock ring 322 moves upward axially 42 as the tapered bottom surface 353 of the second lock ring 322 interfaces with the tapered surface 351 of the groove 350. As the second lock ring 322 moves up and expands radially 44 into the groove 350, a retainer ring 352 also moves axially 42 upward. As the retainer ring 352 moves upward, a gap 354 is opened. At this point, cementing operations may be performed.

In block 410, a second pressure is applied via the test port 342. The pressure applied via the test port 342 may be pneumatic or hydraulic pressure provided via a conduit (e.g., hose, manifold, hydraulic line, etc.), which may be fluidly coupled to a source of pressure (e.g., a pump, a reservoir of hydraulic fluid, a cylinder, etc.). As the second pressure is applied via the test port 342, the pressure in volume 344 increases. The increased pressure in volume 344 pushes the upper piston 306 axially 42 upward. Because the first push ring 316 is coupled to the upper piston 306 via bolts 314, the push ring 316 lifts axially 42 upward as the upper piston 306 is pushed axially 42 upward. As the push ring 316 lifts axially 42 upward, the first lock ring 318 is released, enabling the first lock ring 318 to expand radially 44 outward. As the first lock ring 318 expands radially 44 outward, the teeth 324 of the first lock ring 318 disengage from the teeth 326 of the hanger 301. Because the shear pin 307 has been sheared and the teeth 324 of the first lock ring 318 are disengaged from the teeth 326 of the hanger 301, the hanger running tool 300 and the hanger 301 are decoupled from one another.

In block 412, pressure may then be released via the test port 342. In block 414, the hanger running tool 300 is pulled straight up, removed, and retrieved.

Figure 16:
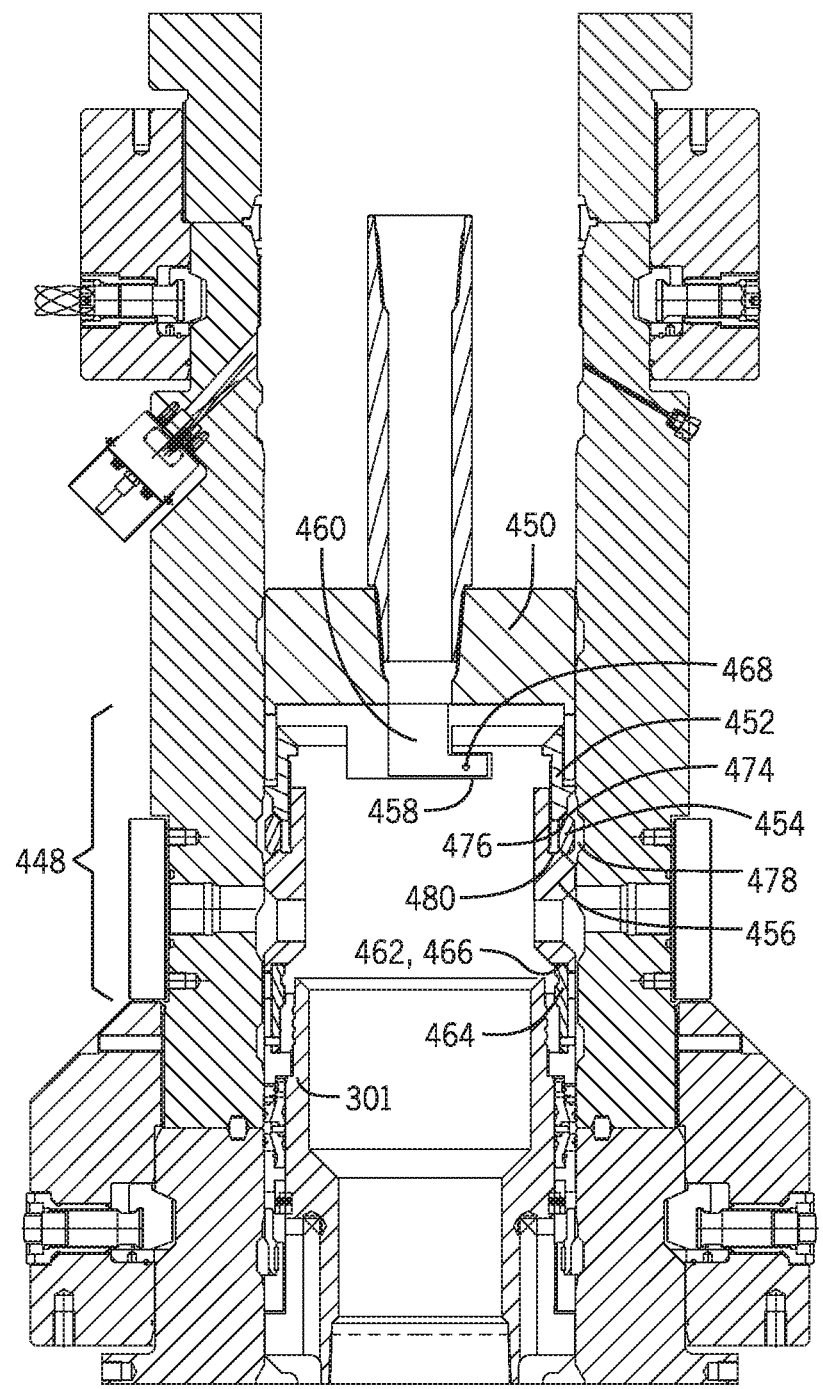
FIG. 16 is a cross sectional side view of an embodiment of a shoulder running tool and a shoulder in the wellhead.
Figure 16:
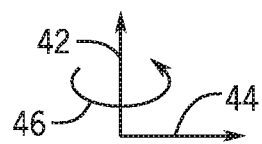

FIGS. 16-20 are various views of embodiments of systems and methods for installing a high strength preload shoulder 448 into the wellhead 12 using a shoulder running tool 450. FIG. 16 is a cross sectional side view of an embodiment of the shoulder running tool 450 and the shoulder 448 in the wellhead 12. In the embodiment shown in FIG. 16, the shoulder 448 may be disposed axially 42 above the hanger 301. However, in other embodiments, the shoulder 448 may be disposed axially 42 below the hanger 301. The shoulder 448 may be used as a support and/or a stop for various components (e.g., hangers, tubing, casing, etc.) within the wellhead 12. The shoulder 448 may include a load ring 452, a lock ring 454, and a retainer ring 456. In some embodiments, the shoulder 448 may include a plurality of J-slots 458 that interface with each of a plurality of corresponding protrusions 460 in the shoulder running tool 450. The shoulder 448 may have a castellated bottom surface 462 (e.g., having a plurality of slots disposed circumferentially 46 about the bottom surface 462). The shoulder 448 is mated to the shoulder running tool 450 via the J-slots 458 in the shoulder running tool 450. The shoulder 448 and the shoulder running tool 450 are lowered axially 24 through the wellhead 12 until the castellated bottom surface 462 of the shoulder 448 rests on a castellated top surface 466 of a preload ring 464. The castellated bottom surface 462 of the shoulder 448 may engage with the castellated top surface 466 of the preload ring 464. The engagement between the shoulder 448 and the shoulder running tool 450 may provide a positive lock when the shoulder running tool 450 is rotated circumferentially 46 clockwise or counter clockwise. In some embodiments, the shoulder running tool 450 may be turned counterclockwise to ensure that the castellated bottom surface 462 is engaged with the castellated top surface 466. This may be referred to as the "running position."

Figure 17:
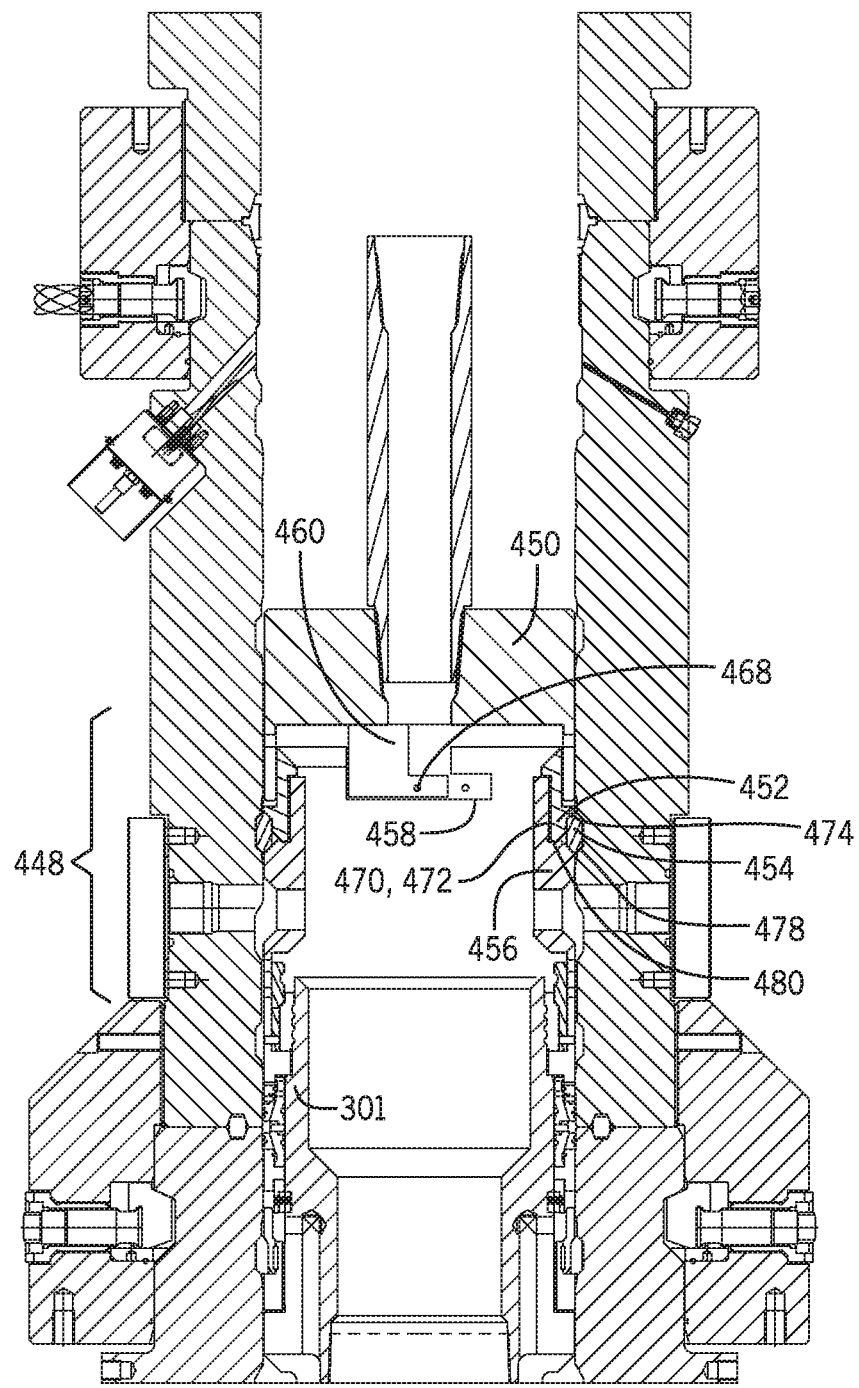
FIG. 17 is a cross sectional side view of an embodiment of the shoulder in the wellhead, illustrating an embodiment of a preloaded lock ring.

FIG. 17 is a cross sectional side view of an embodiment of the shoulder running tool 450 and shoulder 448 with a preloaded lock ring 454 in the wellhead 12. From the running position, the shoulder running tool 450 is rotated circumferentially 46 clockwise, thereby shearing a shear pin 468, and disengaging the protrusion 460 from the J-slot 458. As the shoulder running tool 450 rotates, threads 470 on the load ring 452 engage with threads 472 on the second retainer ring 456, causing the load ring 452 to move axially 42 downward. As the load ring 452 moves axially 42 downward, a tapered bottom surface 474 of the load ring 452 engages with the tapered top surface 476 of the second lock ring 454, pushing the second lock ring 454 radially 44 outward into a recess 478 of the wellhead 12. The second lock ring 454 is preloaded when the load ring 452 lands on a top surface 480 of the second retainer ring 456.

Figure 18:
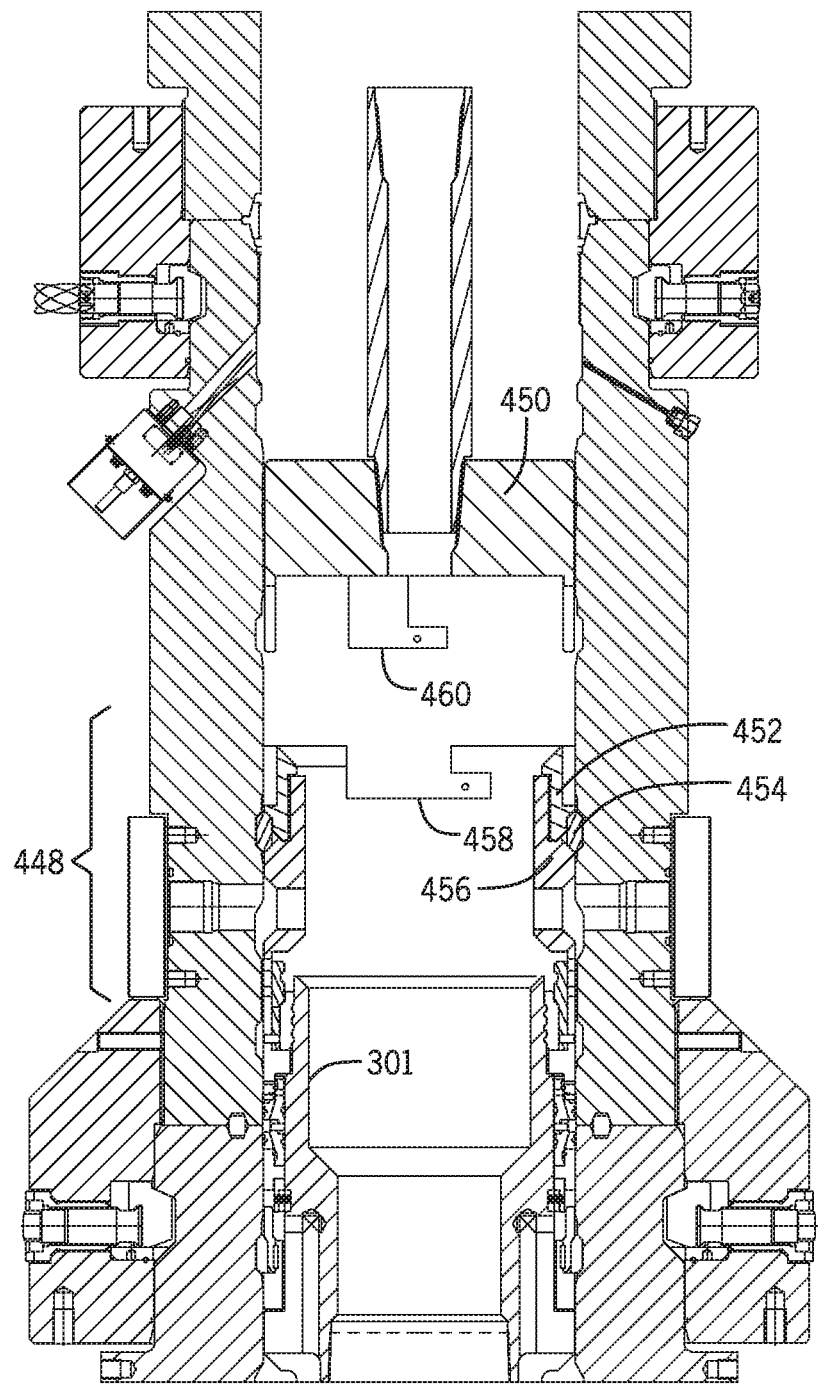
FIG. 18 is a cross sectional side view of an embodiment of the shoulder in the wellhead, illustrating the shoulder running tool being removed from the wellhead.
Figure 19:
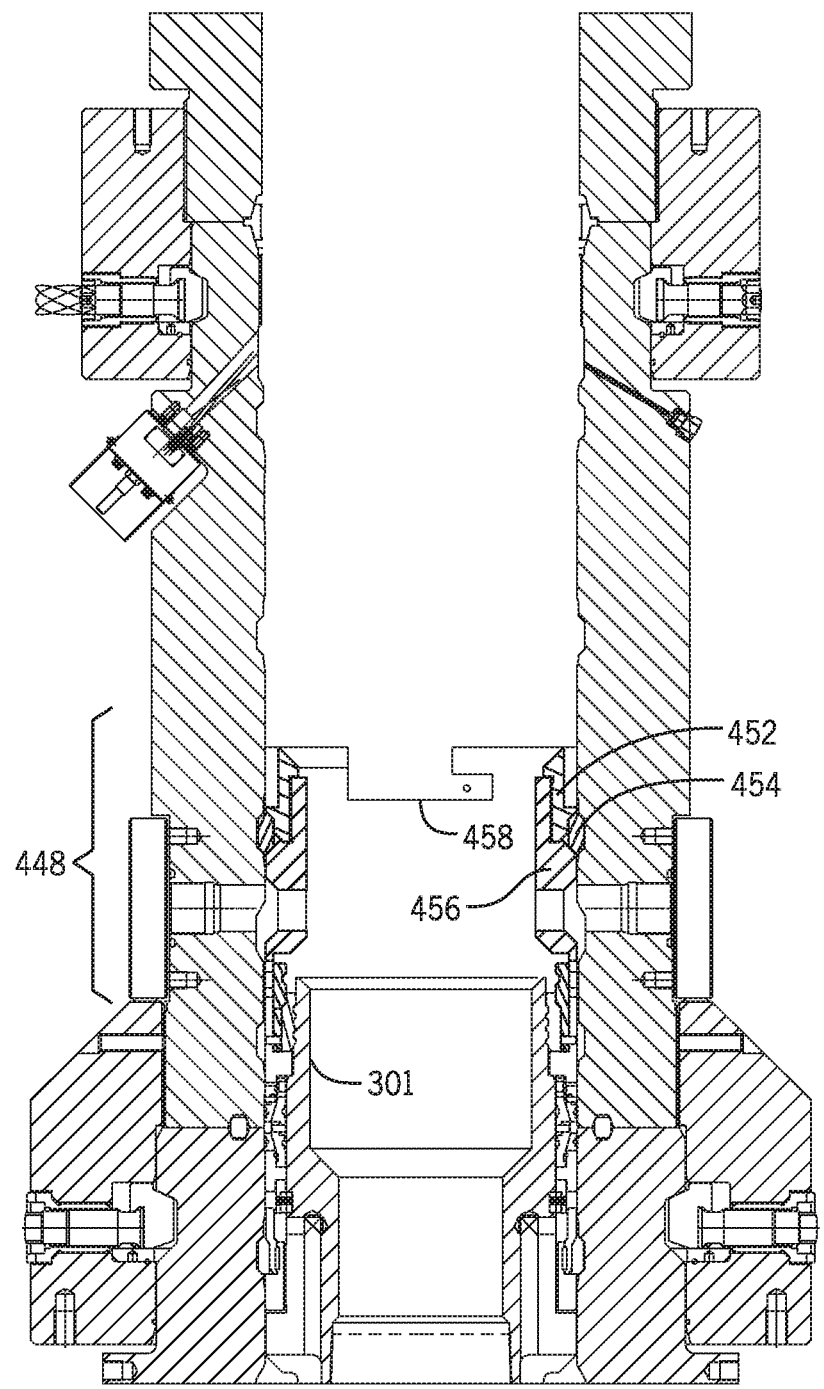
FIG. 19 is a cross sectional side view of an embodiment of the shoulder installed in the wellhead, in accordance with an embodiment of the present disclosure.

FIG. 18 is a cross sectional side view of an embodiment of the shoulder 448 in the wellhead 12, illustrating the shoulder running tool 450 being removed from the wellhead 12. Once the J-slot 458 of the shoulder 448 is disengaged, the shoulder 448 and the shoulder running tool 450 are decoupled from one another. Accordingly, once the second lock ring 454 is preloaded, the shoulder running tool 450 may be removed by pulling the shoulder running tool 450 straight up axially 42 out of the wellhead 12. FIG. 19 is a cross sectional side view of an embodiment of the shoulder 448 in the wellhead 12, illustrating the installed shoulder 448 and the shoulder running tool 450 removed from the wellhead 12.

Figure 20:
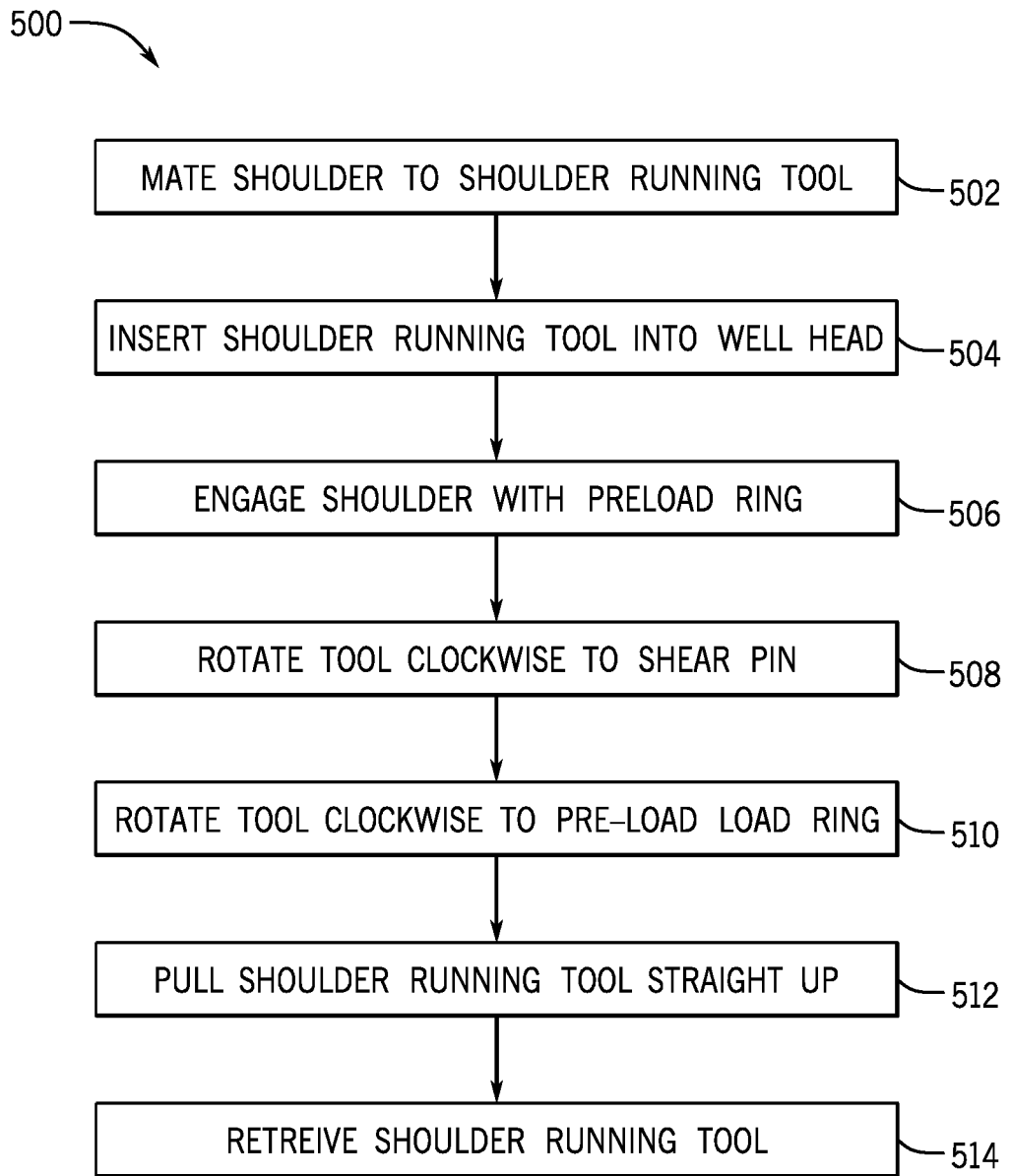
FIG. 20 is a flow chart illustrating one embodiment of a process for installing a shoulder in a wellhead, in accordance with an embodiment of the present disclosure.

FIG. 20 is a flow chart of a process 500 for installing a shoulder 448 in a wellhead 12. In block 502, the shoulder 448 is mated to the shoulder running tool 450. In the illustrated embodiment, the shoulder running tool 448 includes J-slots 458 that interface with corresponding protrusions 460 in the shoulder running tool 450. The shoulder running tool 450 may be inserted into the shoulder 448 such that the protrusions 460 in the shoulder running tool 450 align with the J-slots 458 in the shoulder 448. The shoulder 448 and shoulder running tool 450 may then be rotated relative to one another, locking the shoulder 448 in place and mating it to the shoulder running tool 450.

In block 504, the shoulder running tool 450 and the shoulder 448, which is attached to the shoulder running tool 450, are inserted into the wellhead 12. The shoulder running tool 450 may be lowered through the wellhead 12 until the castellated bottom surface 462 of the shoulder 448 rests on top of the castellated top surface 466 of the preload ring 464. The castellated bottom surface 462 of the shoulder 448 engages with the castellated top surface 466 of the preload ring 464. In block 506, the shoulder running tool 450 may be turned counterclockwise to ensure that the castellated bottom surface 462 is engaged with the castellated top surface 466. This may be referred to as the "running position."

In block 508, the shoulder running tool 450 is rotated clockwise, thereby shearing the shear pin 468, and disengaging the protrusion 460 from the J-slot 458. In block 510, the shoulder running tool 450 is further rotated circumferentially 46 clockwise to pre-load the load ring 452. As the shoulder running tool 450 rotates, the threads 470 on the load ring 452 engage with threads 472 on the second retainer ring 456, causing the load ring 452 to move axially 42 downward. As the load ring 452 moves axially 42 downward, the tapered bottom surface 474 of the load ring 452 interfaces with the tapered top surface 476 of the second lock ring 454, pushing the second lock ring 454 radially 44 outward into the recess 478 of the housing 82. The second lock ring 454 is preloaded when the load ring 452 lands on the top surface 480 of the second retainer ring 456.

In block 512, the shoulder running tool 450 may be removed by pulling the tool straight up out of the wellhead 12. Once the J-slot 458 of the shoulder 448 is disengaged, the shoulder 448 and the shoulder running tool 450 are decoupled from one another. Accordingly, once the second lock ring 454 is preloaded, the shoulder running tool 450 may be removed by pulling the shoulder running tool 450 straight up axially 42 out of the wellhead 12. In block 514 the shoulder running tool 450 may be retrieved.

The present disclosure improves component design, as well as the design of tools for installing said components, in order to enable simpler and more reliable installation of said components. The disclosed techniques may be applied to gaskets, pin hub housings, shoulders, hangers, and other components used at the wellhead of mineral extraction systems.

While the disclosed subject matter may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A system, comprising:
   a shoulder, comprising:
      a retainer ring disposed about a radially interior portion of a load ring comprising an exterior threaded surface, a top surface, and a tapered portion;
      the load ring, comprising a first tapered bottom surface and a threaded interior surface configured to interface with the threaded exterior surface of the retainer ring, wherein the load ring comprises a plurality of J-slots disposed circumferentially about the load ring at a first axial end of the load ring;
      a lock ring comprising a tapered top surface and a second tapered bottom surface, wherein the second tapered bottom surface is configured to interface with the tapered portion of the retainer ring, wherein the tapered top surface is configured to interface with the first tapered bottom surface of the load ring such that when the load ring moves axially toward the lock ring and the top surface of the retainer ring, the lock ring radially expands and when the load ring moves axially away from the lock ring and the top surface of the retainer ring, the lock ring radially contracts, wherein the lock ring is configured to fully expand into an annular recess of a wellhead assembly when the load ring lands on the top surface of the retainer ring; and
      a shear pin extending through a first J-slot of the plurality of J-slots and into a tool body of a shoulder running tool, wherein rotation of the shoulder running tool causes the shear pin to shear.

2. The system of claim 1, comprising a preload ring disposed in the wellhead assembly on which the shoulder is configured to land.

3. The system of claim 2, wherein the shoulder comprises a first castellated bottom surface configured to engage with a castellated top surface of the preload ring, resisting rotation of the shoulder relative to the preload ring.

4. The system of claim 1, wherein the shoulder is configured to support one or more wellhead components.

5. The system of claim 1, wherein the shoulder is axially adjacent a hanger.

6. The system of claim 1, comprising:
   the shoulder running tool, comprising the tool body comprising a plurality of protrusions disposed circumferentially about the tool body and configured to interface with the plurality of J-slots of the load ring;
   wherein, clockwise rotation of the shoulder running tool engages the threaded exterior surface of the retainer ring and the threaded interior surface of the load ring, driving the load ring downward, and driving the lock ring radially outward.

7. The system of claim 6, wherein the shoulder running tool is configured to be run and retrieved through a blowout preventer.

8. The system of claim 6, wherein the system provides a positive lock when the shoulder running tool is rotated in a clockwise direction and a counter clockwise direction.

9. A system, comprising:
   a shoulder, comprising:
      a retainer ring disposed about a radially interior portion of a load ring body comprising an exterior threaded surface, a top surface, and a tapered portion;
      the load ring, comprising a first tapered bottom surface and a threaded interior surface configured to interface with the threaded exterior surface of the retainer ring, wherein the load ring comprises a plurality of J-slots disposed circumferentially about the load ring at a first axial end of the load ring; and
      a lock ring comprising a tapered top surface and a second tapered bottom surface, wherein the second tapered bottom surface is configured to interface with the tapered portion of the retainer ring, wherein the tapered top surface is configured to interface with the first tapered bottom surface of the load ring such that when the load ring moves axially toward the lock ring and the top surface of the retainer ring, the lock ring radially expands and when the load ring moves axially away from the lock ring and the top surface of the retainer ring, the lock ring radially contracts;
   a shoulder running tool, comprising a tool body comprising a plurality of protrusions disposed circumferentially about the tool body and configured to interface with a plurality of J-slots of the load ring; and
   wherein, rotation of the shoulder running tool drives rotation of the load ring, via an interface between the plurality of protrusions and the plurality of J-slots, which drives the load ring axially downward toward the lock ring such that the lock ring of a shoulder expands radially outward into an annular recess of a wellhead assembly, wherein the lock ring is configured to fully expand into the annular recess of the wellhead assembly when the load ring lands on the top surface of the retainer ring.

10. The system of claim 9, comprising a preload ring disposed in the wellhead assembly on which the shoulder is configured to land.

11. The system of claim 10, wherein the shoulder comprises a first castellated bottom surface configured to engage with a castellated top surface of the preload ring, resisting rotation of the shoulder relative to the preload ring.

12. The system of claim 11, comprising a shear pin extending through a first J-slot of the plurality of J-slots of the load ring and each of the protrusions, wherein clockwise rotation of the shoulder running tool causes the shear pin to shear.

13. The system of claim 9, wherein the shoulder running tool is configured to be run and retrieved through a blowout preventer.

14. A method, comprising:
inserting a shoulder and a shoulder running tool into a wellhead assembly, wherein the shoulder running tool comprises a plurality of protrusions disposed circumferentially about a tool body configured to engage with a plurality of J-slots of a load ring, wherein the shoulder comprises retainer ring disposed about a radially interior portion of the load ring comprising an exterior threaded surface, a top surface, and a tapered portion, wherein the shoulder further comprises the load ring, comprising a first tapered bottom surface and a threaded interior surface configured to interface with the threaded exterior surface of the retainer ring, and wherein the shoulder further comprises a lock ring comprising a tapered top surface and a second tapered bottom surface, wherein the second tapered bottom surface is configured to interface with the tapered portion of the retainer ring, wherein the tapered top surface is configured to interface with the first tapered bottom surface of the load ring such that when the load ring moves axially toward the lock ring and the top surface of the retainer ring, the lock ring radially expands and when the load ring moves axially away from the lock ring and the top surface of the retainer ring, the lock ring radially contracts, wherein the lock ring is configured to fully expand into an annular recess of a wellhead assembly when the load ring lands on the top surface of the retainer ring;

landing the shoulder on a preload ring disposed in the wellhead assembly, wherein landing the shoulder comprises engaging a castellated bottom surface of the shoulder with a castellated top surface of the preload ring to resist rotation of the shoulder relative to the preload ring;

rotating the shoulder running tool in a first direction to shear a shear pin;

rotating the shoulder running tool in the first direction such that the interior threaded surface of the load ring interfaces with the exterior threaded surface of the retainer ring to drive the load ring axially toward the lock ring and the top surface of the retainer ring such that the lock ring expands into the annular recess of the wellhead assembly; and retrieving the shoulder running tool from the wellhead assembly.

15. The method of claim 14, comprising:
inserting the each of the plurality of protrusions of the shoulder running tool into each of the plurality of J-slots of the shoulder;

rotating the shoulder running tool in a second direction to capture each of the plurality of protrusions in each of the plurality of J-slots; and inserting the shear pin through a first protrusion of each of the plurality of protrusions and through a first J-slot of each of the plurality of J-slots.

16. The method of claim 14, comprising rotating the shoulder running tool in a second direction to confirm engagement of the castellated top surface and the castellated bottom surface.

17. The method of claim 14, comprising running the shoulder running tool through a blowout preventer.

* * * * *